United States Patent
Novek

(10) Patent No.: US 11,835,269 B2
(45) Date of Patent: *Dec. 5, 2023

(54) SYSTEMS AND METHODS FOR ENHANCED HEAT TRANSFER LOOPS

(71) Applicant: SolvCor Technologies LLC, Houston, TX (US)

(72) Inventor: Ethan Novek, Houston, TX (US)

(73) Assignee: SolvCor Technologies LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,147

(22) Filed: Jan. 4, 2023

(65) Prior Publication Data

US 2023/0160612 A1 May 25, 2023

Related U.S. Application Data

(63) Continuation of application No. 17/166,700, filed on Feb. 3, 2021, which is a continuation-in-part of application No. 16/826,469, filed on Mar. 23, 2020, now Pat. No. 10,948,224, application No. 18/093,147 is a continuation of application No. 17/008,165, filed on Aug. 31, 2020, now Pat. No. 11,643,583, which is a continuation of application No. 16/445,855, filed on Jun. 19, 2019, now Pat. No. 10,472,550, which is a continuation of application No. 16/258,384, filed on Jan. 25, 2019, now Pat. No. 10,414,961.

(60) Provisional application No. 63/296,336, filed on Jan. 4, 2022, provisional application No. 62/822,501, filed on Mar. 22, 2019, provisional application No. 62/872,851, filed on Jul. 11, 2019, provisional application No. 62/976,398, filed on Feb. 14, 2020, provisional application No. 62/984,394, filed on Mar. 3, 2020, provisional application No. 62/988,999, filed on Mar. 13, 2020, provisional application No. 62/969,211, filed on Feb. 3, 2020, provisional application No. 62/969,774, filed on Feb. 4, 2020, provisional application No. 62/622,528, filed on Jan. 26, 2018, provisional application No. 62/670,117, filed on May 11, 2018, provisional application No. 62/771,902, filed on Nov. 27, 2018.

(51) Int. Cl.
| F25B 15/00 | (2006.01) |
| C09K 5/06 | (2006.01) |
| C09K 5/10 | (2006.01) |
| F28D 20/02 | (2006.01) |
| F25B 45/00 | (2006.01) |

(52) U.S. Cl.
CPC ............ F25B 15/002 (2013.01); C09K 5/066 (2013.01); C09K 5/10 (2013.01); F25B 45/00 (2013.01); F28D 20/023 (2013.01)

(58) Field of Classification Search
CPC ........ F25B 15/002; F25B 45/00; C09K 5/066; C09K 5/10; C09K 5/00; F28D 20/023; F28F 23/00; B01D 53/00
USPC ...................................................... 62/4, 112
See application file for complete search history.

(56) References Cited

U.S. PATENT DOCUMENTS

| 10,400,148 | B2 * | 9/2019 | Novek | .................. F25B 37/00 |
| 10,414,961 | B2 * | 9/2019 | Novek | .................. F25J 1/0211 |
| 10,472,550 | B1 * | 11/2019 | Novek | .................. C09K 3/185 |
| 10,576,413 | B2 * | 3/2020 | Novek | ................ B01D 53/1475 |
| 10,808,156 | B2 * | 10/2020 | Novek | .................. F25J 1/0022 |
| 10,948,224 | B2 * | 3/2021 | Novek | .................. F25B 45/00 |
| 2002/0078696 | A1 | 6/2002 | Korin | |
| 2004/0211726 | A1 | 10/2004 | Baig et al. | |
| 2011/0058637 | A1 | 3/2011 | Campbell et al. | |
| 2016/0167974 | A1 * | 6/2016 | Novek | .................. C07C 273/10 |
| | | | | 423/437.1 |
| 2017/0267538 | A1 * | 9/2017 | Novek | .................. H02K 7/1823 |
| 2018/0259229 | A1 * | 9/2018 | Moghaddam | ........... F25B 15/06 |
| 2019/0143260 | A1 * | 5/2019 | Novek | ............... B01D 53/1487 |
| | | | | 95/206 |
| 2019/0233296 | A1 * | 8/2019 | Novek | ............... B01D 53/1468 |
| 2019/0233697 | A1 * | 8/2019 | Novek | .................. F25B 15/14 |
| 2020/0188840 | A1 * | 6/2020 | Novek | ............... B01D 53/1431 |
| 2020/0199519 | A1 | 6/2020 | Hickey | |
| 2020/0363108 | A1 | 11/2020 | Novek | |
| 2021/0356178 | A1 * | 11/2021 | Novek | ............... F28D 20/0034 |

(Continued)

FOREIGN PATENT DOCUMENTS

| WO | WO-2015103199 A1 * | 7/2015 | ............. F25B 17/02 |
| WO | WO-2017058747 A1 * | 4/2017 | ............. C09K 5/047 |

OTHER PUBLICATIONS

S. Gat et al., Heat transfer enhancement via liquid-liquid phase separation, International Journal of Heat and Mass Transfer, 52 (2009), 1385-1399. (Year: 2009).*

(Continued)

*Primary Examiner* — Douglas J Mc Ginty
(74) *Attorney, Agent, or Firm* — Hunton Andrews Kurth LLP

(57) ABSTRACT

The present application pertains to processes and systems for enhanced heat transfer. In some embodiments a process is described for removing a portion of a chemical from a heat transfer loop comprising a heat transfer fluid. The process may comprise adding a solvent to the heat transfer fluid in the heat transfer loop; removing at least a portion of the heat transfer fluid from the heat transfer loop; separating said removed heat transfer fluid into a permeate and a retentate using a membrane; and adding at least a portion of the permeate to the heat transfer fluid in the heat transfer loop.

27 Claims, 1 Drawing Sheet

(56) References Cited

U.S. PATENT DOCUMENTS

2023/0220258 A1* 7/2023 Novek .................... F25B 37/00
165/10

OTHER PUBLICATIONS

International Search Report and Written Opinion dated Jun. 2, 2023 received in PCT/US2023/10106.

* cited by examiner

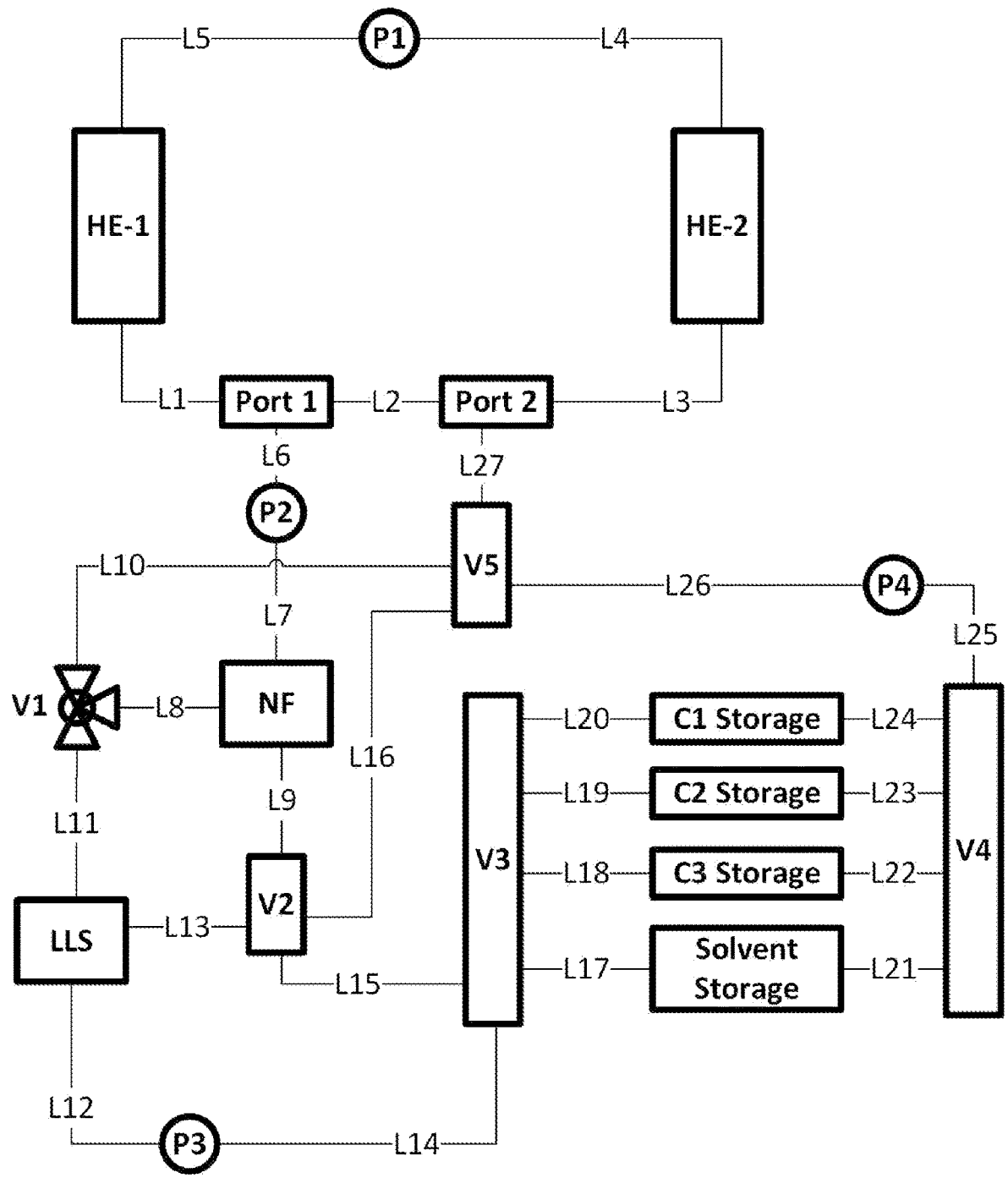

SYSTEMS AND METHODS FOR ENHANCED HEAT TRANSFER LOOPS

CROSS-REFERENCE TO RELATED APPLICATIONS

The instant application claims priority to U.S. Provisional Application No. 63/296,336 filed Jan. 4, 2022 which application is incorporated herein by reference. The application also claims priority to pending U.S. application Ser. No. 17/166,700 filed Feb. 3, 2021 which application is a continuation-in-part of U.S. application Ser. No. 16/826,469 filed Mar. 23, 2020. U.S. application Ser. No. 16/826,469 claims priority to U.S. provisional application Nos. 62/822,501 filed Mar. 22, 2019; 62/872,851 filed Jul. 11, 2019; 62/976,398 filed Feb. 14, 2020; 62/984,394 filed Mar. 3, 2020; 62/988,999 filed Mar. 13, 2020; 62/969,211 filed Feb. 3, 2020; and 62/969,774 filed Feb. 4, 2020.

This application also claims priority to pending U.S. application Ser. No. 17/008,165 filed Aug. 31, 2020 which application is continuation of Ser. No. 16/580,962 filed Sep. 24, 2019 which application is a continuation of Ser. No. 16/445,855 filed Jun. 19, 2019 which application is a continuation of U.S. Ser. No. 16/258,384 filed Jan. 25, 2019 which application claims priority to U.S. Provisional application Nos. 62/622,528 filed Jan. 26, 2018; 62/670,117 filed May 11, 2018; and 62/771,902 filed Nov. 27, 2018.

All of the aforementioned applications are incorporated herein by reference.

BACKGROUND AND SUMMARY

In some applications, heat transfer loops operate in essential processes or business critical processes, which may operate nearly full time, or near full capacity factor, or any combination thereof. For example, chilled water loops in data centers, or petrochemical plants, or polyolefin plants, or refineries, or LNG liquefaction facilities, to name a few, may require continuous operation, wherein interruption or pausing operations may be expensive and time intensive. In some applications, it may be desirable for the liquid level in a heat transfer loop to remain consistent or at a desired level. For example, operators of commercial buildings, or HVAC, or chilled water HVAC, or district cooling, or district heating, to name a few, may desire to keep liquid levels or heat transfer fluid levels in their heat transfer loops at a consistent liquid level or a desired level. It may be desirable to increase or improve the thermal properties of the heat transfer fluid, such as the effective specific heat capacity, or heat carrying capacity, or heat transfer coefficient, or any combination thereof. The thermal properties of a heat transfer fluid, such as water, may be improved by installing or adding a chemical which, in combination with water or other solvent, forms a heat transfer fluid with improved thermal properties. The thermal properties of a heat transfer fluid, such as water, may be improved by installing or adding a chemical to form a liquid-liquid phase transition composition with improved thermal properties. It may be desirable for the installation of a thermal property enhancing chemical to occur while minimizing or preventing or avoiding interruption of operations of the process associated with the heat transfer loop. Some embodiments of the present invention may pertain to systems and methods for installing, or swapping, or removing thermal property enhancing or improving chemicals while enabling the heat transfer loop to operate, or while minimizing or preventing or avoiding interruptions or disruptions of operation.

In some applications, the temperature range of operation or thermal loads may vary. For example, in some applications, the temperature range of cooling or a heat transfer loop may change depending on the ambient temperature and/or humidity conditions. For example, in some applications, such as power generation cooling, or data center cooling, or LNG liquefaction cooling, or petrochemical plants cooling, or refineries cooling, or manufacturing facility cooling, or industrial process cooling, to name a few, the temperature of cooling or heat transfer loop temperature may vary depending on the ambient or outside temperature conditions, or the thermal load, or any combination thereof. For example, a petrochemical facility may have a chilled water loop operating with a 15 degree Celsius supply and 25 degree Celsius return temperature during the winter, and a 35 degree Celsius supply temperature and a 45 degree Celsius return temperature during the summer. In some embodiments, chemicals which enhance or improve thermal properties of a heat transfer fluid, such as water, may operate within a temperature window or temperature range. In some embodiments, when the heat transfer loop operating temperature range changes from a first temperature range to a second temperature range, it may be desirable to replace the first chemical optimized for enhancing the thermal properties in the first temperature range with a second chemical optimized for enhancing the thermal properties in the second temperature range. It may be desirable for said replacing, which may also be referred to as swapping, to be conducted in a manner which enables the heat transfer loop to operate while replacing or swapping is occurring, or be conducted in a manner to minimize or avoid interruptions while replacing or swapping is occurring. In some embodiments, when the heat transfer loop operating temperature range changes from a first temperature range to a second temperature range, it may be desirable to adjust the concentration of a chemical to optimize the enhancement of thermal properties for the second temperature range. In some embodiments, may be desirable to employ thermal property enhancing chemicals during certain time periods, and/or operate without thermal property enhancing chemicals during certain other time periods. In some embodiments, may be desirable to employ thermal property enhancing chemicals at a first concentration during certain time periods, and/or operate with thermal property enhancing chemicals at a second concentration certain other time periods. Some embodiments of the present invention may pertain to systems and methods for installing, or swapping, adjusting, or removing, or any combination thereof thermal property enhancing or improving chemicals while enabling the heat transfer loop to operate, or while minimizing or preventing or avoiding interruptions or disruptions.

BRIEF FIGURE DESCRIPTIONS

FIG. 1: Process for Adding, or Adjusting, or Removing, or Storing, or Swapping, or Replacing Chemical or Solvent in a Heat Transfer Loop.

DEFINITIONS

Solvent: In some embodiments, a solvent may comprise a reagent which dissolves liquid-liquid phase transition chemicals and forms a composition comprising liquid-liquid phase transition composition in the presence of liquid-liquid phase transition chemicals. In some embodiments, a solvent may comprise a low molecular weight reagent. For example, a solvent may comprise a reagent with a molecular weight sufficiently small to permeate a reverse osmosis membrane, or a membrane which may reject a 'chemical.' For example, in some embodiments, solvents may comprise, including, but not limited to, one or more or any combination of the following: water, or ethylene glycol, or propylene glycol, or glycerol, or urea, or ethanol, or methanol, or propanol, or butanol, or alcohol, or diethyl ether, or dimethyl ether, or acetone, or acetonitrile, or DMSO, or toluene, or volatile organic solvent, or non-volatile organic solvent, or ammonia, or sulfur dioxide, or carbon dioxide, or bromine, acetyl aldehyde, or formaldehyde, or methyl acetate, or ethyl acetate, or acetic acid, or formic acid, or THF, or any combination thereof.

Chemical: In some embodiments, a chemical may comprise a reagent which forms a liquid-liquid phase transition composition in a solution or mixture with a solvent. In some embodiments, a chemical may comprise a reagent which enhances or increases or improves one or more or any combination of thermal, or physical, or thermo-physical properties of a heat transfer fluid, which may include, but are not limited to, one or more or any combination of the following: specific heat capacity, effective specific heat capacity, or thermal conductivity, or effective thermal conductivity, or viscosity, or corrosion, or fouling, or biofouling, or scaling, or degradation, or oxidation. For example, a chemical may comprise a liquid-liquid phase transition reagent. In some embodiments, a chemical may comprise a reagent with a molecular weight sufficiently large to be rejected by a reverse osmosis membrane, or a membrane which may permeate a 'solvent.' For example, in some embodiments, a chemical may comprise, including, but not limited to, one or more or any combination of the following: a glycol polymer, or a polypropylene glycol (PPG), or a polyethylene glycol (PEG), or a block-polymer, or a EO polymer, or a PO polymer, or a glycol ether, or a glycol ether polymer, or any combination thereof.

Heat Transfer Loop: A heat transfer loop may comprise a system or method with a heat transfer fluid. A heat transfer loop may comprise a system or method or facility employing heat transfer for cooling, or heating, or thermal storage. In some embodiments, a heat transfer loop may comprise, including, but not limited to: a closed loop, or open loop, or hybrid loop, or any combination thereof. A heat transfer loop may comprise including, but not limited to, one or more or any combination of the following: a chilled water loop, or a hot water loop, or a chiller loop, or cooling loop, or heating loop, or ground loop, or geothermal loop, or district cooling system, or district heating system, or HVAC system, or plant cooling system, or plant heating system, or heating supply, or cooling supply, or thermal storage system, or desalination system, or solar thermal system.

"About the same as": "About the same as" may mean differing in composition, or a property by less than one or more or any combination of the following: 0.01%, or 0.05%, or 0.1%, or 0.2%, or 0.3%, or 0.4%, or 0.5%, or 0.6%, or 0.7%, or 0.8%, or 0.9%, or 1.0%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 15%, or 20%, or 25%, or 30%, or 35%, or 40%, or 45%, or 50%.

Heat Transfer Fluid: Heat Transfer Fluid may comprise a fluid, such as one or more or any combination of liquids or liquid phases, which may be employed in transferring heat, or cooling, or heating, or storing heat, or storing 'cold', or any combination thereof.

Liquid-Liquid Phase Transition Temperature Range: A Liquid-Liquid Phase Transition Temperature Range may comprise the temperature range which a liquid-liquid phase transition composition, when heated or cooled through the temperature range, experiences a change in the number, or volume, or distribution, or composition, chemical distribution, or viscosity, or any combination thereof of liquid phases. A Liquid-Liquid Phase Transition Temperature Range may coincide with or correlate with an Enthalpy of Liquid-Liquid Phase Transition Temperature Range, which may comprise the temperature range where the effective specific heat capacity of a composition may be greater than the additive specific heat capacities of each of the compositions' individual chemical components. A Liquid-Liquid Phase Transition Temperature Range may coincide with or correlate with an Enthalpy of Liquid-Liquid Phase Transition Temperature Range, which may comprise the temperature range where a composition absorbs or releases heat from a liquid-liquid phase transition.

Cloud Point Temperature: A cloud point temperature may comprise the temperature which a composition experiences a significant or dramatic change in its opacity. In some embodiments, cloud point temperature may comprise a temperature which a composition changes from a single liquid phase to two or more liquid phases, or from two or more liquid phases to a single liquid phases. In some embodiments, a cloud point temperature may exist in or correlate with an a liquid-liquid phase transition temperature range.

Membrane-Based Process: A Membrane-Based Process may comprise a separation process. A Membrane-Based Process may comprise a cooling process or storage process. A Membrane-Based Process may comprise a separation process employing a membrane. For example, a membrane-based process may comprise including, but not limited to, one or more or any combination of the following: reverse osmosis, or nanofiltration, or organic solvent nanofiltration, or ultrafiltration, or microfiltration, or forward osmosis, or osmotically assisted reverse osmosis, or osmotically assisted nanofiltration, or electrodialysis, or electrodialysis reversal, or membrane distillation.

Desired Volume of Heat Transfer Fluid: Some heat transfer loops must maintain a minimum level or volume of heat transfer fluid to enable the heat transfer loop to function or operate properly. In some embodiments, it may be desirable to monitor or control the amount of liquid or 'fluid' added and/or removed from a heat transfer loop to ensure the volume or level of heat transfer fluid in the heat transfer loop is sufficient for the heat transfer loop to properly function and/or operate. The desired volume of heat transfer fluid or desired level of heat transfer fluid in a heat transfer loop may vary depending on, including, but not limited to, for example, one or more or any combination of the following: the state of operations, or the volumetric capacity of the heat transfer loop, or the heat transfer loop flow rate, or the nature of the thermal load, or the viscosity of the heat transfer fluid, or the physical properties of the heat transfer fluid, or the pressure of the heat transfer fluid, or the pressure drop of the heat transfer fluid, or any combination thereof.

Excess Solvent: Excess Solvent may comprise the portion of solvent removed or to be removed to provide volumetric space or capacity or to otherwise enable or facilitate the installation or addition of chemical to a heat transfer loop. Some heat transfer loops have limited volumetric capacity. In some embodiments, when chemical is added to a heat transfer loop, some of the heat transfer fluid must be removed from the heat transfer loop to provide space for the volume of chemical added. In some embodiments, it may be desirable for the portion of heat transfer fluid removed to comprise solvent, rather than chemical. In some embodiments, a membrane-based process may be employed to enable a portion of solvent to be removed from the heat transfer loop, while enabling chemical to remain in the heat transfer loop. In some embodiments, a membrane-based process may be employed to separate the portion of heat transfer fluid removed into a permeate and a retentate, wherein the permeate may comprise solvent and the retentate may comprise chemical. The retentate may be added or returned to the heat transfer loop. The permeate may comprise solvent or 'excess solvent', which may indicate the solvent is being or has been removed from the heat transfer fluid in the heat transfer loop.

Effective Specific Heat Capacity: The effective specific heat capacity may comprise the measured specific heat capacity of a liquid-liquid phase transition composition in an enthalpy of liquid-liquid phase transition temperature range. The effective specific heat capacity may be different than the specific heat capacity of the individual isolated chemical components of a composition because of the heat absorbed or released in an enthalpy of liquid-liquid phase transition.

Effective Thermal Conductivity: The effective thermal conductivity may comprise the measured thermal conductivity of a liquid-liquid phase transition composition in an enthalpy of liquid-liquid phase transition temperature range. The effective thermal conductivity may be different than the thermal conductivity of the individual isolated chemical components of a composition because of the heat absorbed or released in an enthalpy of liquid-liquid phase transition and/or convective heat transfer properties due to changes in the number, or volume, or amount, or properties, or any combination thereof of liquid phases in a liquid-liquid phase transition composition.

DESCRIPTION

Example FIG. 1 Detailed Description

Summary:

FIG. 1 may comprise an example of systems and/or methods for installing, or adding, or adjusting, or removing, or swapping, or any combination thereof chemical in a heat transfer fluid in a heat transfer loop. In some embodiments, components labeled "L1-L-5, P1, RE-1, HE-2" may comprise an example heat transfer loop. In some embodiments, components labeled "L6-L-27, P2-P4, V1-V5, C1-C3 Storage, Solvent Storage, LLS, NF, Port 1, Port 2" may comprise an example of systems and/or methods for installing, or adding, or adjusting, or removing, or swapping, or any combination thereof. The heat transfer loop may comprise monitoring or flow control equipment, which may comprise components of the systems and/or methods for installing, or adding, or adjusting, or removing, or swapping, or any combination thereof chemical.

FIG. 1 may further comprise additional equipment which may not be shown in the drawing. For example, additional equipment may include, but are not limited to, one or more or any combination of the following: chiller, or thermal storage, or buffer tank, or air coil, or additional thermal loads, or thermal load, or HVAC equipment, or pump, or valve, or flow controller, or flow meter, or concentration monitor, or water treatment chemical supplier, or water treatment chemical monitor, or corrosion monitor, or degradation monitor, or specific heat capacity measurement system or method, or thermal conductivity measurement system or method, or system or method for measuring the number and/or volume of liquid phases, or system or method for measuring or monitoring viscosity, or system or method for measuring or monitoring pressure drop, or pressure sensor, or temperature sensor.

FIG. 1 may show a system with capability to add, or adjust, or replace, or remove, or store, or any combination thereof up to three different chemicals and one solvent. For example, in some embodiments, the three chemicals and one solvent may comprise, for example, C1: PPG 425, C2: PPG 725, C3: PPG 1000, Solvent: Water. For example, in some embodiments, the three chemical may comprise, for example, C1: PPG 725, C2: PPG 1000, C3: PPG 2000 Solvent: Water+Ethylene Glycol. For example, in some embodiments, the chemicals and one solvent may comprise, for example, C1: PPG 1000, C2: PPG 2000, Solvent: Water+Ethylene Glycol.

FIG. 1 Key:

| | FIG. 1 Key |
|---|---|
| Label | Description |
| L1 | L1 may comprise Heat Transfer Fluid in Heat Transfer Loop. May comprise a pipe. |
| L2 | L2 may comprise Heat Transfer Fluid in Heat Transfer Loop. May comprise a pipe. |
| L3 | L3 may comprise Heat Transfer Fluid in Heat Transfer Loop. May comprise a pipe. |
| L4 | L4 may comprise Heat Transfer Fluid in Heat Transfer Loop. May comprise a pipe. |
| L5 | L5 may comprise Heat Transfer Fluid in Heat Transfer Loop. May comprise a pipe. |
| L6 | L6 may comprise a portion of Heat Transfer Fluid transferred from the Heat Transfer Loop. May comprise a pipe to Heat Transfer Fluid transferred to or from the Heat Transfer Loop. L6 may be cooled to below a liquid-liquid phase transition temperature range or cloud point temperature. |
| L7 | L7 may comprise pressurized heat transfer fluid, which may comprise feed for a membrane-based separation process, such as nanofiltration. L7 may be cooled to below a liquid-liquid phase transition temperature range or cloud point temperature. L7 may comprise a single-liquid phase state solution. May comprise a portion of Heat Transfer Fluid transferred from the Heat Transfer Loop. May comprise a pipe to Heat Transfer Fluid transferred to or from the Heat Transfer Loop. |

-continued

FIG. 1 Key

| Label | Description |
|---|---|
| L8 | L8 may comprise retentate from a separation process or membrane-based separation process, such as nanofiltration. L8 may comprise chemical and/or solvent, or may comprise a composition comprising chemical and/or solvent. |
| L9 | L9 may comprise permeate from a separation process or membrane-based separation process, such as nanofiltration. L9 may comprise solvent. |
| L10 | L10 may comprise liquid transferred to or from V5. L10 may comprise retentate transferred to V5. L10 may be employed, for example, if the system is adding a portion of chemical to a heat transfer loop, while, for example, removing a portion of solvent. |
| L11 | L11 may comprise retentate transferred to LLS, which may comprise a liquid-liquid separation system or method. |
| L12 | L12 may comprise a liquid phase separated in LLS. L12 may comprise a pipe for transferring one or more liquid phases separated in LLS. For example, in some embodiments, L12 may comprise a separated liquid phase comprising a solvent. For example, in some embodiments, L12 may comprise a separated liquid phase comprising a chemical. For example, in some embodiments, L12 may comprise a separated liquid phase comprising a solvent, or a separated liquid phase comprising a chemical, or any combination thereof. |
| L13 | L13 may comprise solvent being transferred from or to V2. L13 may comprise permeate comprising solvent and a chemical being transferred to LLS. L13 may comprise solvent from LLS being transferred to V2. L13 may comprise permeate being transferred to LLS from NF. |
| L14 | L14 may comprise the same as L12. L14 may comprise L12 after pumping. L14 may comprise the fluid from L12 being transferred to V3. |
| L15 | L15 may comprise permeate or solvent transferred from V2 to V3. |
| L16 | L16 may comprise liquid transferred to or from V2. L16 may comprise permeate or solvent transferred from V2 to V5. |
| L17 | L17 may comprise solvent transferred from V3 to Solvent Storage. |
| L18 | L18 may comprise chemical, which may comprise Chemical 3, being transferred to C3 Storage. |
| L19 | L19 may comprise chemical, which may comprise Chemical 2, being transferred to C2 Storage. |
| L20 | L20 may comprise chemical, which may comprise Chemical 1, being transferred to CI Storage. |
| L21 | L21 may comprise solvent being transferred from Solvent Storage to V4. |
| L22 | L22 may comprise chemical, which may comprise Chemical 3, being transferred from C3 Storage to V4. |
| L23 | L23 may comprise chemical, which may comprise Chemical 2, being transferred from C2 Storage to V4. |
| L24 | L24 may comprise chemical, which may comprise Chemical 1, being transferred from Cl Storage to V4. |
| L25 | L25 may comprise a liquid transferred from V4 to P4. |
| L26 | L26 may comprise a liquid transferred from P4 to V5. |
| L27 | L27 may comprise a liquid or fluid transferred from V5 into Port 2, which may comprise adding a liquid or fluid, such as a chemical, or a solvent, or any combination thereof, to a heat transfer loop. |
| HE-1 | HE-1 may comprise a heat exchanger, or a thermal load, or an application requiring cooling, or an application requiring heating. |
| HE-2 | HE-2 may comprise a heat exchanger, or a thermal load, or an application requiring cooling, or an application requiring heating. |
| P1 | P1 may comprise a pump, or flow meter, or flow controller, or valve, or monitoring equipment, or viscosity measuring equipment, or concentration monitoring equipment, or composition monitoring equipment, or a heating device, or a chilling device, or a chemical dosing device, or any combination thereof. |
| P2 | P2 may comprise a pump, or flow meter, or flow controller, or valve, or monitoring equipment, or viscosity measuring equipment, or concentration monitoring equipment, or composition monitoring equipment, or a heating device, or a chilling device, or a chemical dosing device, or any combination thereof. |
| P3 | P3 may comprise a pump, or flow meter, or flow controller, or valve, or monitoring equipment, or viscosity measuring equipment, or concentration monitoring equipment, or composition monitoring equipment, or a heating device, or a chilling device, or a chemical dosing device, or any combination thereof. |
| P4 | P4 may comprise a pump, or flow meter, or flow controller, or valve, or monitoring equipment, or viscosity measuring equipment, or concentration monitoring equipment, or composition monitoring equipment, or a heating device, or a chilling device, or a chemical dosing device, or any combination thereof. |

-continued

| FIG. 1 Key | |
|---|---|
| Label | Description |
| V1 | V1 may comprise a valve, or a pump, or flow meter, or flow controller, or monitoring equipment, or viscosity measuring equipment, or concentration monitoring equipment, or composition monitoring equipment, or a heating device, or a chilling device, or a chemical dosing device, or any combination thereof. V1 may direct the transfer of retentate from NF. |
| V2 | V2 may comprise a valve, or a pump, or flow meter, or flow controller, or monitoring equipment, or viscosity measuring equipment, or concentration monitoring equipment, or composition monitoring equipment, or a heating device, or a chilling device, or a chemical dosing device, or any combination thereof. V2 may direct the transfer of permeate from NF, or solvent to or from LLS, or any combination thereof. |
| V3 | V3 may comprise a valve, or a pump, or flow meter, or flow controller, or monitoring equipment, or viscosity measuring equipment, or concentration monitoring equipment, or composition monitoring equipment, or a heating device, or a chilling device, or a chemical dosing device, or any combination thereof. V3 may direct the transfer of solvent, or chemical, or any combination thereof from various sources to storage. |
| V4 | V4 may comprise a valve, or a pump, or flow meter, or flow controller, or monitoring equipment, or viscosity measuring equipment, or concentration monitoring equipment, or composition monitoring equipment, or a heating device, or a chilling device, or a chemical dosing device, or any combination thereof. V4 may direct the transfer of solvent, or chemical, or any combination thereof from storage to the heat transfer loop, or various uses, or any combination thereof. |
| V5 | V3 may comprise a valve, or a pump, or flow meter, or flow controller, or monitoring equipment, or viscosity measuring equipment, or concentration monitoring equipment, or composition monitoring equipment, or a heating device, or a chilling device, or a chemical dosing device, or any combination thereof. V3 may direct the transfer of solvent, or chemical, or any combination thereof from various sources to the heat transfer loop. |
| C1 Storage | C1 Storage may comprise storage for a chemical, such as Chemical 1. |
| C2 Storage | C2 Storage may comprise storage for a chemical, such as Chemical 2. |
| C3 Storage | C3 Storage may comprise storage for a chemical, such as Chemical 3. |
| Port 1 | Port 1 may comprise an opening to a heat transfer loop. Port 1 may comprise where heat transfer fluid, or solvent, or chemical, or any combination thereof may be removed from or added to the heat transfer loop. Port 1 may be where heat transfer fluid may be removed from the heat transfer loop. |
| Port 2 | Port 2 may comprise an opening to a heat transfer loop. Port 2 may comprise where heat transfer fluid, or solvent, or chemical, or any combination thereof may be removed from or added to the heat transfer loop. Port 2 may be where heat transfer fluid may be added to the heat transfer loop. |
| Solvent Storage | Solvent Storage may comprise storage for a solvent. |
| NF | NF may comprise a separation system or method. NF may separate a portion of heat transfer fluid. For example, NF may separate heat transfer fluid or removed heat transfer fluid into solvent and/or chemical. For example, NF may separate heat transfer fluid or removed heat transfer fluid into two or more streams. For example, NF may separate heat transfer fluid or removed heat transfer fluid into a first stream and a second stream, wherein the first stream may comprise a first chemical and a second stream may comprise a second chemical. For example, NF may comprise a membrane-based process. For example, NF may comprise nanofiltration, or reverse osmosis, or organic solvent nanofiltration, or ultrafiltration, or microfiltration, or osmotically assisted reverse osmosis, or forward osmosis, or any combination thereof. For example, NF may separate a heat transfer fluid, which may comprise a heat transfer fluid stream, into a retentate and a permeate. |
| LLS | LLS may comprise a separation process. LLS may comprise a liquid-liquid separation process. LLS may comprise storage or temporary storage. LLS may comprise, for example, including, but not limited to, one or more or any combination of the following: decanter, or tank, or enclosure, or storage, or centrifuge, or coalescer, or filter, or cyclone, or de-emulsifier, or a heater, or a cooler, or a chiller, or a concentration monitor, or a opacity monitor, or a liquid phase monitor, or a composition monitor, or a temperature monitor, or a viscosity monitor, or phase monitor, or liquid phase monitor, or diffraction monitor, or volume monitor, or density monitor, or specific heat monitor. |

FIG. 1 Example Step-by-Step Descriptions

Example Adding Chemical (1) An operator, which may be a human, or animal, or computer, or an AI, or any combination thereof, may determine it is desirable to add at least a portion of a chemical to a heat transfer loop. For the present example, the chemical added to the heat transfer loop may comprise Chemical 2, which, for the present example, may comprise, for example, PPG 1000.

(2) Adding Chemical: A portion of Chemical 2 may be transferred from storage and may be added to the Heat Transfer Loop. For example, a portion of Chemical 2 may be transferred from C2 Storage through L24, through V4, through L-25, through P4, through L26, through V5, through L27, and/or through Port 2 into the heat transfer loop.

(3) Removing Heat Transfer Fluid: A portion of Heat Transfer Fluid may be removed from the heat transfer loop. For example, a portion of Heat Transfer Fluid may be transferred from L1 or L2, through Port 2, through P2, through L7, to NF.

Note: It is important to note that, in some embodiments, heat transfer fluid or solvent may not be removed when chemical is removed.

(4) Separating Heat Transfer Fluid using NF: Heat transferred fluid transferred to NF may be separated into a retentate and a permeate. In some embodiments, chemical may be added when little or no chemical may be present in the heat transfer fluid in the heat transfer loop. In some embodiments, chemical may be added when chemical may be present in the heat transfer fluid in the heat transfer loop. In some embodiments, if, for example, chemical is present in the Heat Transfer Fluid and/or the chemical present possesses a molecular weight sufficiently large to be rejected by the NF membrane, the permeate may comprise solvent and the retentate may comprise chemical or a solution comprising chemical and solvent. For example, in the present example, the permeate may comprise water and the retentate may comprise PPG 1000. In some embodiments, the retentate may comprise a concentration of chemical greater than, for example, 5 wt %, or 10 wt %, or 15 wt %, or 20 wt %, or 25 wt %, or 30 wt %, or 35%, or 40 wt %, or 45 wt %, or 50 wt %, or any combination thereof chemical. For example, for the present example, the retentate may comprise an aqueous solution of PPG 1000 with a 35 wt % PPG 1000 concentration. In some embodiments, it may be desirable for the heat transfer fluid to be at a single liquid phase state, or at a temperature below an LCST cloud point, or at a temperature above an UCST cloud point, or any combination thereof before or during separation using NF. For example, in the present example, it may be desirable to cool the heat transfer fluid below the liquid-liquid phase transition temperature range or cloud point temperature of PPG 1000 at the concentration of the retentate solution before or during NF. For example, in the present example, it may be desirable to cool the heat transfer fluid below the liquid-liquid phase transition temperature range or cloud point temperature of PPG 1000 at the concentration of the retentate solution before or during NF, to, for example, ensure the heat transfer fluid is at a single liquid phase during NF separation.

(5) Adding Retentate to Heat Transfer Loop: Retentate may be added to the heat transfer fluid in the heat transfer loop. For example, retentate may be transferred from NF, through L8, through V1, through L10, through V5, through L27, through Port 2, and/or into the heat transfer loop.

(6) Storing Permeate: Permeate, which may comprise solvent, may be transferred to storage or stored. For example, permeate may be transferred from NF, through L9, through V2, through L15, through V3, through L17, and/or into Solvent Storage.

(7) Pausing or Changing Rate of Removal of Heat Transfer Fluid and/or Addition of Chemical when desired, or when desired concentration of chemical is achieved in the heat transfer loop, or any combination thereof.

Example Removing Chemical (1) An operator, which may be a human, or animal, or computer, or an AI, or any combination thereof, may determine it is desirable to remove at least a portion of chemical to a heat transfer loop.

(2) Adding Solvent: A portion of solvent may be transferred from storage and may be added to the Heat Transfer Loop. For example, a portion of Solvent may be transferred from Solvent Storage through L21, through V4, through L-25, through P4, through L-26, through V5, through L27, and/or through Port 2 into the heat transfer loop.

Note: It is important to note that, in some embodiments, solvent may not be added when chemical is removed.

(3) Removing Heat Transfer Fluid: A portion of Heat Transfer Fluid may be removed from the heat transfer loop. For example, a portion of Heat Transfer Fluid may be transferred from L1 or L2, through Port 2, through P2, through L7, to NF.

(4) Separating Heat Transfer Fluid using NF: Heat transferred fluid transferred to NF may be separated into a retentate and a permeate. In some embodiments, chemical may be added when little or no chemical may be present in the heat transfer fluid in the heat transfer loop. In some embodiments, chemical may be added when chemical may be present in the heat transfer fluid in the heat transfer loop. In some embodiments, if, for example, chemical is present in the Heat Transfer Fluid and/or the chemical present possesses a molecular weight sufficiently large to be rejected by the NF membrane, the permeate may comprise solvent and the retentate may comprise chemical or a solution comprising chemical and solvent. For example, in the present example, the permeate may comprise water and the retentate may comprise PPG 1000. In some embodiments, the retentate may comprise a concentration of chemical greater than, for example, 5 wt %, or 10 wt %, or 15 wt %, or 20 wt %, or 25 wt %, or 30 wt %, or 35%, or 40 wt %, or 45 wt %, or 50 wt %, or any combination thereof chemical. For example, for the present example, the retentate may comprise an aqueous solution of PPG 1000 with a 35 wt % PPG 1000 concentration. In some embodiments, it may be desirable for the heat transfer fluid to be at a single liquid phase state, or at a temperature below an LCST cloud point, or at a temperature above an UCST cloud point, or any combination thereof before or during separation using NF. For example, in the present example, it may be desirable to cool the heat transfer fluid below the liquid-liquid phase transition temperature range or cloud point temperature of PPG 1000 at the concentration of the retentate solution before or during NF. For example, in the present example, it may be desirable to cool the heat transfer fluid below the liquid-liquid phase transition temperature range or cloud point temperature of PPG 1000 at the concentration of the retentate solution before or during NF, to, for example, ensure the heat transfer fluid is at a single liquid phase during NF separation.

(5) Separating Retentate into a Liquid Phase Comprising Solvent and a Liquid Phase Comprising Chemical: The retentate may be at a multi-liquid phase state or may be transformed into a multi-liquid phase state. For example, the retentate may be heated before or during LLS to form a multi-liquid phase mixture, or a mixture comprising two liquid phases. For example, the retentate may undergo a liquid-liquid phase transition into a first liquid phase and a second liquid phase, wherein the first liquid phase comprises solvent and the second liquid phase comprises chemical. For the present example, the first liquid phase may comprise greater than 80 wt %, or 85 wt %, or 90 wt %, or 95 wt % water and the second liquid phase may comprise greater than 70 wt %, or 75 wt %, or 80 wt %, or 85 wt %, or 90 wt %, or 95 wt % PPG 1000. LLS may separate the first liquid phase from the second liquid phase. For the present example, LLS may allow the liquid phases to settle, wherein the first liquid phase forms a first liquid layer and the second liquid phase comprises a second liquid layer within a tank or storage vessel and/or LLS may separate the first liquid phase and the second liquid phase by, for example, decanting.

(6) Storing Chemical: In some embodiments, separated second liquid phase, which may comprise a chemical, may be transferred to chemical storage. For example, a liquid phase comprising Chemical 2 may be transferred to C2 Storage. For the present example, a liquid phase comprising PPG 1000 may be transferred to storage for PPG 1000.

Note: In some embodiments, separated second liquid phase, which may comprise a chemical, may be added to the heat transfer fluid in the heat transfer loop. For example, a liquid phase comprising Chemical 2 may be added to the heat transfer fluid in the heat transfer loop. For the present example, a liquid phase comprising PPG 1000 may be added to the heat transfer fluid in the heat transfer loop.

(7) Adding Solvent: In some embodiments, separated first liquid phase, which may comprise a solvent, may be added to the heat transfer fluid in the heat transfer loop. For example, a liquid phase comprising solvent may be added to the heat transfer fluid in the heat transfer loop. For the present example, a liquid phase comprising water may be added to the heat transfer fluid in the heat transfer loop. For example, separated first liquid phase may be transferred from LLS, through L13, through V2, through L16, through V5, through L27, through Port 2, and/or into the heat transfer loop. In some embodiments, the separate first liquid phase may undergo further purification to remove, for example, at least a portion of residual chemical. For example, in some embodiments, the first liquid phase may be transferred to NF, or to a different or additional membrane based process, or any combination thereof, wherein the permeate may comprise solvent which may be added to the heat transfer loop or may be stored.

Note: In some embodiments, separated first liquid phase, which may comprise a solvent, may be transferred to solvent storage. For example, a liquid phase comprising solvent may be transferred to Solvent Storage. For the present example, a liquid phase comprising water may be transferred to storage for water.

(8) Pausing or Changing Rate of Removal of Heat Transfer Fluid and/or Addition of Chemical when desired, or when desired concentration of chemical is achieved in the heat transfer loop, or any combination thereof.

Note: In some embodiments, removing a portion of heat transfer fluid from a heat transfer loop may be conducted before adding to the heat transfer loop. In some embodiments, removing a portion of heat transfer fluid from a heat transfer loop may be conducted before adding a portion of a composition comprising chemical to the heat transfer loop. In some embodiments, removing a portion of heat transfer fluid from a heat transfer loop may be conducted before adding a portion of a composition comprising solvent to the heat transfer loop.

Detailed Description

Some embodiments may enable the addition or installation of chemical to a heat transfer loop, while ensuring added chemical remains in the heat transfer loop while excess solvent is removed from the heat transfer loop.

Some embodiments may enable the removal of chemical from a heat transfer loop, while enabling the addition of solvent to the heat transfer loop and/or enabling consistent or desired levels of heat transfer fluid in the heat transfer loop.

Some embodiments may enable the selective replacement of one chemical with a different chemical, or the adjustment in concentration of one chemical relative to a different chemical, or any combination thereof within a heat transfer loop.

Example Embodiment (1) Replacing a First Chemical, such as PPG 425, in Process with a Solvent, such as Water:
   Option 1: Remove a portion of heat transfer fluid from a heat transfer loop. Transfer the said removed portion of heat transfer fluid into a membrane-based process, such as RO or NF. It may be desirable for the removed portion of heat transfer fluid to comprise a single liquid phase combined solution, or a liquid-liquid phase transition composition below its cloud point temperature or liquid-liquid phase transition temperature range. In some embodiments, it may be desirable to cool the liquid-liquid phase transition composition below its cloud point temperature or liquid-liquid phase transition temperature range to form a single liquid phase combined solution before or while transferring to a membrane-based process. The membrane-based process may separate the removed portion of heat transfer fluid into a permeate and a retentate. The permeate, such may comprise water, may be transferred to or added to the heat transfer loop. Additional water, which may be from storage, may be added to the heat transfer loop and/or the additional water may comprise a volume of water about the same as the volume of retentate. It may be desirable for the water added to the process, for example, in the form of permeate or additional water, to be about the same volume as the volume of the portion of net heat transfer fluid removed or volume of retentate to, for example, maintain a consistent level or amount or volume of heat transfer fluid in the heat transfer loop and/or to ensure the heat transfer loop possesses a desired amount of heat transfer fluid. The retentate may be transferred to a liquid-liquid separation process, or storage, or any combination thereof. The present process may be conducted until the concentration of the first chemical is below a certain threshold or level or concentration in the heat transfer fluid in the heat transfer loop. In some embodiments, the membrane-based process may be conducted with the heat transfer fluid below a cloud point temperature. In some embodiments, the membrane-based process may be conducted with the heat transfer fluid above a cloud point temperature.

Option 2:
  Step A: A portion of Solvent, such as water, may be added to a heat transfer loop and a portion of heat transfer fluid may be removed from the heat transfer loop. The portion of removed heat transfer fluid may be stored. As Solvent is added, the concentration of First Chemical in the heat transfer loop may decrease, and the concentration of First Chemical in the removed heat transfer fluid decrease. The portion of removed heat transfer fluid may be stored, which may enable the First Chemical and/or solvent in the portion of removed heat transfer fluid to be recovered or separated. When the concentration of the First Chemical reaches a desired level in the heat transfer fluid in the heat transfer loop, the adding of First Chemical may be stopped and the removing of a portion of heat transfer may be stopped.

Step B: Stored removed heat transfer fluid may comprise a single liquid phase combined solution, or a multi-liquid phase mixture, or any combination thereof and/or may be below, or at, or above a cloud point temperature range or liquid-liquid phase transition temperature range. The stored removed heat transfer fluid may be at or below a cloud point temperature range or liquid-liquid phase transition temperature range, it may be desirable to heat the heat transfer fluid to a temperature at or above its cloud point temperature range or liquid-liquid phase transition temperature range (if LCST) or it may be desirable to cool the heat transfer fluid to a temperature at or below its cloud point temperature range or liquid-liquid phase transition temperature range (if UCST), to form a multi-liquid phase mixture or a composition comprising two liquid phases. The two liquid phases may be separated by a liquid-liquid separation or physical separation, such as, for example, settling, or coalescing, or decanting. One of the two liquid phases may comprise First Chemical and one of the two liquid phases may comprise Solvent. The liquid phase comprising First Chemical may be stored in a tank storing First Chemical. The liquid phase comprising Solvent may be stored in a tank storing Solvent. In some embodiments, the liquid phase comprising Solvent may be further purified to, for example, remove or separate at least a portion of residual First Chemical, which may be conducted using, for example, a membrane-based process, such as RO or NF. In some embodiments, it may be desirable to cool the solution to a temperature at or below the liquid-liquid phase transition temperature range of the First Chemical at its concentration in the resulting retentate solution. The permeate from said membrane-based process may comprise Solvent. The retentate from said membrane-based process may be transferred to the storage of removed heat transfer fluid for further separating.

(2) Separate Retentate into a Liquid Phase Comprising a First Chemical, such as PPG 425, and a liquid phase comprising a Solvent, such as Water: Retentate may be heated to at or above the cloud point temperature or liquid-liquid phase transition temperature range, which may result in the formation of a multi-liquid phase mixture comprising two liquid phases. The two liquid phases may be stored and/or separated. For example, the two liquid phases may be stored in a settling tank or decanter. The liquid phase comprising first chemical may separate, such as gravitationally, into a distinct liquid layer from the liquid phase comprising the solvent. The liquid layer comprising first chemical may be separated from the liquid layer comprising solvent by, for example, decanting. The separated liquid phase comprising first chemical may be stored in a storage tank storing first chemical. The liquid phase comprising solvent may be stored in a storage tank storing solvent. In some embodiments, the liquid phase comprising solvent may be further purified to, for example, remove a portion of residual First Chemical, by employing a membrane-based process such as nanofiltration (NF) or reverse osmosis (RO). Retentate from said further purification membrane-based process may be mixed with the retentate before, during, or after formation of a multi-liquid phase mixture. Permeate from said further purification membrane based process may comprise solvent and may be stored as solvent.

(3)
  Option 1: Adding or Installing Chemical, such as Second Chemical, into a Heat Transfer Loop while removing a portion of Solvent, such as water, while avoid or preventing or minimizing the removal of Second Chemical when removing said portion of Solvent from the Heat Transfer Loop. Removing a portion of Solvent when adding Second Chemical may be required to ensure the volume of heat transfer fluid in the heat transfer loop or thermal storage system remains relatively consistent or at a desired amount or level:

A portion of Second Chemical may be added to the heat transfer loop while a portion of heat transfer fluid may be removed from the heat transfer loop. Said portion of removed heat transfer fluid may be separated into a retentate and a permeate using a membrane-based process, such as NF or RO. The retentate may comprise Second Chemical or a solution of Second Chemical and solvent, and/or may be added to or returned to the heat transfer loop. The permeate may comprise solvent and/or may be stored.

It may be desirable to monitor the volume of heat transfer fluid in the heat transfer loop and/or the liquid levels. It may be desirable for the volume of Second Chemical added to be about the same as the volume of permeate removed to, for example, ensure the volume of liquid in the heat transfer loop remains consistent or at a desired level. Storage tanks or buffer tanks may be employed to ensure proper process operation or liquid volumes or liquid flow rates in, for example, the heat transfer loop, even in the event of one step in the process operating at a different rate than another step in the process, or a disruption or interruption in the process, or any combination thereof.

Option 2:
  Step A: A portion of Second Chemical, such as PPG 1000, may be added to a heat transfer loop and a portion of heat transfer fluid may be removed from the heat transfer loop. The portion of removed heat transfer fluid may be stored. As Second Chemical is added, the concentration of second chemical in the heat transfer loop increases, and the concentration of Second Chemical in the removed heat transfer fluid increases. The portion of removed heat transfer fluid may be stored, which may enable the Second Chemical and/or solvent in the portion of removed heat transfer fluid to be recovered or separated. When the concentration of the Second Chemical reaches a desired level in the heat transfer fluid in the heat transfer loop, the adding of Second Chemical may be stopped and the removing of a portion of heat transfer may be stopped.
  Step B: Stored removed heat transfer fluid may comprise a single liquid phase combined solution, or a multi-liquid phase mixture, or any combination thereof and/or may be below, or at, or above a cloud point temperature range or liquid-liquid phase transition temperature range. The stored removed heat transfer fluid may be at or below a cloud point temperature range or liquid-liquid phase transition temperature range, it may be desirable to heat the heat transfer fluid to a temperature at or above its cloud point temperature range or liquid-liquid phase transition temperature range (if LCST) or it may be desirable to cool the heat transfer fluid to a temperature at or below its cloud point temperature range or liquid-liquid phase transition temperature range (if UCST), to form a multi-liquid phase mixture or a composition comprising two liquid phases. The two liquid phases may be separated by a liquid-liquid separation or physical separation, such as, for example, settling, or coalescing, or decanting. One of the two liquid phases may comprise Second Chemical and one of the two liquid phases may comprise Solvent. The liquid phase comprising Second Chemical may be stored in a tank storing Second Chemical. The liquid phase comprising Solvent may be stored in a tank storing Solvent. In some embodiments, the liquid phase comprising Solvent may be further purified to, for example, remove or separate at least a portion of residual Second Chemical, which may be conducted using, for example, a membrane-based process, such as RO or NF.
  In some embodiments, it may be desirable to cool the solution to a temperature at or below the liquid-liquid phase transition temperature range of the Second Chemical at its concentration in the resulting retentate solution. The permeate from said membrane-based process may comprise Solvent. The retentate from said membrane-based process may be transferred to the storage of removed heat transfer fluid for further separating.
  Note: (1), or (2), or (3) may comprise individual processes and/or may be conducted independently. (1), or (2), or (3) may comprise individual and/or independent embodiments. For example, (3) may be employed as a system or process for installing chemical in a system or process, such as a heat transfer system, or heat transfer loop, or thermal storage system. For example, (1) may be employed as a system or process for removing chemical from a system or process, such as a heat transfer system, or heat transfer loop, or thermal storage system. For example, (2) may be employed as a system or process for separating and/or storing liquid-liquid phase transition compositions.

Example Embodiment

In some embodiments, multiple chemicals may be present in a heat transfer loop, or heat transfer fluid, or heat transfer fluid in the heat transfer loop, or any combination thereof simultaneously. Some embodiments may involve adjusting the concentration of a first chemical, or adjusting the concentration of a second chemical, or adjusting the concentration of a third chemical, or adjusting the concentration of a chemical, or removing a chemical, or adding a chemical, or any combination thereof. Some embodiments may involving removing or adding a First Chemical, while enabling a Second Chemical to remain in the heat transfer loop. For example, some embodiments may employ membrane-based processes with different pore size membranes, or membranes with different molecular weight cutoffs, or membranes with optimized molecular weight cutoffs, or any combination thereof to enable the separation or addition of one chemical relative to another chemical, or enable the selective adjustment in concentration of a chemical, or any combination thereof.

For example, some embodiments may involve adding a first chemical to a heat transfer fluid in a heat transfer loop while removing a second chemical from the heat transfer fluid in the heat transfer loop. For example, a portion of first chemical may be added to a heat transfer loop and a portion of heat transfer fluid may be removed from the heat transfer loop. The portion of heat transfer fluid removed from the heat transfer loop may be transferred into a membrane-based process. It may be desirable for the portion of heat transfer fluid removed from the heat transfer loop to be at a single liquid phase combined solution state or at a temperature at or below a cloud point or at or below a liquid-liquid phase transition temperature range before or while entering the membrane-based process. The membrane-based process may be designed to selectively separate a first chemical from a second chemical, or a second chemical from a first chemical, or any combination thereof. For example, a membrane-based process may employ a membrane with a molecular weight cutoff or pore size sufficiently large to allow the second chemical to permeate the membrane, while sufficiently small to reject at least a portion of the first chemical. For example, the first chemical may comprise PPG 1000, while the second chemical may comprise PPG 425. In some embodiments, the membrane-based process may employ, for example, a nanofiltration membrane with a pore size such that at least a portion of the PPG 1000 may be rejected, while at least a portion of the PPG 425 permeates the membrane. For example, the retentate may comprise the First Chemical, and may be added to or transferred to or returned to the heat transfer loop. For example, the permeate may comprise the Second Chemical, and may be stored. Said stored permeate may be separated into two liquid phases in a liquid-liquid phase transition and a liquid-liquid separation and/or additional purification may separate said stored permeate into separately stored Second Chemical and Solvent. In some embodiments, it may be desirable for the volume of First Chemical and/or retentate and/or additional solvent added to the heat transfer loop to be about the same or similar to the volume of permeate removed to, for example, enable a consistent volume of heat transfer fluid in the heat transfer loop or to enable a desired volume of heat transfer fluid in the heat transfer loop. The addition of First Chemical, and/or the removal of Heat Transfer Fluid, or the membrane-based process, or the addition of retentate to the heat transfer loop, or the addition of additional solvent to the heat transfer loop, or removal or storage of permeate, or any combination thereof may be paused or adjusted when a desired concentration of First Chemical, or desired concentration of Second Chemical, or any combination thereof may be reached.

For example, some embodiments may involve adding a second chemical to a heat transfer fluid in a heat transfer loop while removing a first chemical from the heat transfer fluid in the heat transfer loop. For example, a portion of second chemical may be added to a heat transfer loop and a portion of heat transfer fluid may be removed from the heat transfer loop. The portion of heat transfer fluid removed from the heat transfer loop may be transferred into a membrane-based process. It may be desirable for the portion of heat transfer fluid removed from the heat transfer loop to be at a single liquid phase combined solution state or at a temperature at or below a cloud point or at or below a liquid-liquid phase transition temperature range before or while entering the membrane-based process. The membrane-based process may be designed to selectively separate a first chemical from a second chemical, or a second chemical from a first chemical, or any combination thereof. For example, a membrane-based process may employ a membrane with a molecular weight cutoff or pore size sufficiently large to allow the second chemical to permeate the membrane, while sufficiently small to reject at least a portion of the first chemical. For example, the first chemical may comprise PPG 1000, while the second chemical may comprise PPG 425. In some embodiments, the membrane-based process may employ, for example, a nanofiltration membrane with a pore size such that at least a portion of the PPG 1000 may be rejected, while at least a portion of the PPG 425 permeates the membrane. For example, the permeate may comprise the Second Chemical, and may be added to or transferred to or returned to the heat transfer loop. For example, the retentate may comprise the First Chemical, and may be stored. Said stored retentate may be separated into two liquid phases in a liquid-liquid phase transition and a liquid-liquid separation and/or additional purification may separate said stored First Chemical and Solvent. In some embodiments, it may be desirable for the volume of First Chemical and/or retentate and/or additional solvent removed from the heat transfer loop to be about the same or similar to the volume of permeate added to, for example, enable a consistent volume of heat transfer fluid in the heat transfer loop or to enable a desired volume of heat transfer fluid in the heat transfer loop. The addition of Second Chemical, and/or the removal of Heat Transfer Fluid, or the membrane-based process, or the addition of permeate to the heat transfer loop, or the addition of additional solvent to the heat transfer loop, or removal or storage of retentate, or any combination thereof may be paused or adjusted when a desired concentration of First Chemical, or desired concentration of Second Chemical, or any combination thereof may be reached.

In some embodiments, the flow rate of fluid, such as liquid, entering and/or exiting the heat transfer loop is monitored and/or controlled to ensure, for example, the heat transfer loop is operating at desired flow rates, or pressures, or pressure drops. In some embodiments, flow rate, or pressure drop, or viscosity, or concentration, or temperature, or any combination thereof may be monitored. It may be important to adjust flow rate, or pressure, or concentration during concentration adjustment, or addition of chemical, or removal of chemical to ensure the heat transfer loop may be operating at a desired performance level or in a desired fashion.

In some embodiments, each chemical may be stored in separate tanks.

In some embodiments, two or more, or three or more, or four or more, or five or more chemicals may be employed to achieve the desired performance and/or capabilities. For example, in some embodiments, PPG 425, or PPG 725, or PPG 1000, or PPG 1200, or PPG 2000, or any combination thereof may be employed, or added, or removed, or adjusted, or stored, or any combination thereof as desired.

Store a solution comprising a solvent, such as water, and a solution comprising chemical, such as PPG, in separate tanks Settling/Decanting System or Tank Propylene Glycol and/or Ethylene Glycol and/or Glycerol may comprise solvent. For example, Propylene Glycol and/or Ethylene Glycol and/or Glycerol may possess a sufficiently small molecular weight to pass through some membranes in some membrane based processes described or employed herein.

Monitor the concentration and/or molecular weight of chemical in the heat transfer fluid.

For example, in some embodiments, a chemical may comprise a polypropylene glycol, and/or the molecular weight of polypropylene glycol and concentration of each molecular weight of polypropylene glycol may be monitored, or controlled, or adjusted, or any combination thereof to achieve desired goals. For example, raising the temperature range which the enhancement in effective heat capacity occurs may involve reducing the concentration or removing at least a portion of larger molecular weight polypropylene glycol and/or increasing the concentration or adding at least a portion of smaller molecular weight polypropylene glycol. For example, raising the temperature range which the enhancement in effective heat capacity occurs from 15-25 degrees Celsius to 25-33 degrees Celsius may involve reducing the concentration or removing at least a portion of PPG 1000 and/or increasing the concentration or adding at least a portion of PPG 725. For example, raising the temperature range which the enhancement in effective heat capacity occurs may involve reducing the concentration or removing at least a portion of larger molecular weight polypropylene glycol and/or increasing the concentration or adding at least a portion of smaller molecular weight polypropylene glycol. For example, raising the temperature range which the enhancement in effective heat capacity occurs from 15-25 degrees Celsius to 25-33 degrees Celsius may involve reducing the concentration or removing at least a portion of PPG 1000 and/or increasing the concentration or adding at least a portion of PPG 725. In some embodiments, the temperature of the temperature range of enhanced heat capacity or the enthalpy of liquid-liquid phase transition temperature range may increase with decreasing molecular weight of PPG. For example, PPG 2000 may possess a lower temperature range of enhanced heat capacity than PPG 1200, and/or PPG 1200 may possess a lower temperature range of enhanced heat capacity than PPG 1000, and/or PPG 1000 may possess a lower temperature range of enhanced heat capacity than PPG 725, and/or PPG 725 may possess a lower temperature range of enhanced heat capacity than PPG 425. Additionally, the temperature range of enhanced heat capacity and/or the temperature range of an enthalpy of liquid-liquid phase transition may be adjusted with concentration. For example, the temperature range of enhanced heat capacity and/or the temperature range of an enthalpy of liquid-liquid phase transition of PPG 1000 in water may increase with decreasing concentration in water. For example, the temperature range of enhanced heat capacity and/or the temperature range of an enthalpy of liquid-liquid phase transition of PPG 1000 in water may be between 12-22 degrees Celsius with a 20 wt % concentration of PPG 1000 in water, while the said temperature range may exist above 22 degrees Celsius, or above 23 degrees Celsius, or above 24 degrees Celsius, or above 25 degrees Celsius at a PPG 1000 concentration of 5 wt % PPG 1000 in water.

Other separation processes may be employed instead of or in addition to reverse osmosis.

For example, a liquid-liquid separation may be employed. For example, a portion of heat transfer fluid may be removed and separated into at least two separate liquid phases. For example, a portion of heat transfer fluid may be removed at a multi-liquid phase state, or above an LCST cloud point temperature, or below a UCST cloud point temperature, or any combination thereof, then may be separated by liquid-liquid separation. For example, a portion of heat transfer fluid may be removed and heated to a temperature above an LCST cloud point temperature, or cooled to a temperature below a UCST cloud point temperature, or any combination thereof to enable the formation of a multi-liquid phase state, then the multi-liquid phase mixture may be separated by liquid-liquid separation into at least two separate liquid phases. In some embodiments, the two liquid phases may comprise a first liquid phase and a second liquid phase, and/or the first liquid phase may comprise solvent and the second liquid phase may comprise chemical. In some embodiments, the separate liquid phases may be stored separately. In some embodiments, the liquid phase comprising solvent may be further purified, to, for example, remove at least a portion of residual chemical, by, for example, a membrane based process or other separation process.

For example, distillation, or multi-effect distillation, or multi-stage flash distillation, or vapor compression distillation, or crystallization, or freezing, or freezing separation, or extraction, or salting-out, or addition of a salt to make organic phase insoluble or less soluble, or liquid-liquid phase transition, or physical separation, or gravitational separation, or settling, or centrifuge, or coalescer, or de-emulsification, or decanting, or liquid-liquid separation, or any combination thereof may be employed.

Additional Composition, Systems, and/or Methods Description

Summary

Some embodiments may pertain to compositions enhanced effective heat capacity and/or freezing point depression. Some embodiments may pertain to liquid-liquid phase transition compositions. Some embodiments may pertain to compositions which possess an effective specific heat capacity greater than the specific heat capacity of prior art heat transfer compositions, or antifreeze compositions, or any compositions, while, for example, possessing the same or lower freezing point temperature. Some embodiments may pertain to useful properties in, for example, including, but not limited to, one or more or any combination of the following: heat transfer, or heat capacity, or thermal properties, or non-thermal properties, or liquid-liquid phase transition temperature, or liquid-liquid phase transition temperature adjustment, or viscosity, or any combination thereof. Some embodiments may pertain to the adjustment of a liquid-liquid phase transition temperature range, or cloud point temperature range, or any combination thereof. Some embodiments may pertain to example applications. Some embodiments may pertains to systems and methods for improving the quality, or desirability, or performance of one or more or any combination of liquid-liquid phase transition compositions or solutions.

Example Embodiments

Water-Polypropylene Glycol 2000-Propylene Glycol
Description of Composition

Some embodiments may comprise a composition comprising Water, Polypropylene Glycol, and a freezing point depressant additive which may reduce the freezing point of the solution. In some embodiments, said freezing point depressant additive may comprise, including, but not limited to, one or more or any combination of the following: propylene glycol, or ethylene glycol, or glycol, or glycerin, or urea.

Example Range of Compositions:

Water concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Polypropylene Glycol concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Freezing Point Depressant concentration may be less than, or greater than, or equal to, one or more or b any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Tables

TABLE 1

Freezing Point of Water-PPG 2000-PG Solutions

| PG/Water Percent | DI Water(g) | PPG 2000 (g) | Propylene Glycol (g) | Freezing Point (degrees C.) |
|---|---|---|---|---|
| 15.4% | 52 | 20 | 8 | −5 |
| 20% | 50 | 20 | 10 | −8.3 |
| 25% | 48 | 20 | 12 | −8.3 |

Notes

The freezing point of the water-polypropylene glycol 2000-propylene solutions decreased with increasing concentration of propylene glycol until about −8.3 degrees Celsius.

At 8.3 degrees Celsius, a portion of the solution appears to solidify into a waxy solid, while most of the solution remains a liquid. The stir bar continued to rotate despite the presence of waxy solid in portions of the container, such as on a portion of the container walls, indicating only a portion of the constituents solidified, while a substantial portion remained at a liquid phase.

The presence of the waxy solid at about 8.3 degrees Celsius in the solution with 20 wt % Propylene Glycol and the solution with 25 wt % Propylene Glycol, which may indicate the temperature which the waxy solid forms may be at least in part independent of the concentration of Propylene Glycol in the present solutions.

The wax solid possesses similar properties to frozen or solid phase polypropylene glycol 2000. The waxy solid may comprise solid phase polypropylene glycol 2000, which may, at least in part, solidified out of solution.

Below the cloud point temperature range, which may appear between 6.5 degrees Celsius and 8 degrees Celsius, the present solutions may comprise a single liquid phase combined solution or a multi-liquid phase mixture.

In some embodiments, the mixture may comprise a lower proportional amount of an organic liquid phase and a greater proportional amount of aqueous liquid phase below the cloud point temperature range and above the freezing point temperature, than compared to at temperatures above the cloud point temperature range.

It may be possible to eliminate or greatly reduce the presence of an organic liquid phase below the cloud point temperature by treating the solution according to the following:
1. Create solution
2. Cool solution to a temperature below the cloud point temperature range
3. Filter or otherwise selectively remove the residual viscous organic liquid phase from the lower viscosity aqueous liquid phase.

In some embodiments, if said separated lower viscosity aqueous liquid phase is heated to above its cloud point temperature range and then cooled to below its cloud point temperature range, the resulting cooled solution at a temperature below its cloud point temperature range may comprise a single liquid phase combined solution with a substantially lower concentration of viscous organic liquid phase compared to said solution in '2.'

In some embodiments, said residual viscous organic liquid phase may comprise impurities, or polypropylene glycol of potentially undesirable molecular weights, or potentially undesirable types of glycol polymer, or any combination thereof.

Water-Polypropylene Glycol 2000-Propylene Glycol-Diethylene Glycol Hexyl Ether

Description of Composition

Some embodiments may comprise a composition comprising Water, Polypropylene Glycol, and a freezing point depressant additive which may reduce the freezing point of the solution. In some embodiments, Polypropylene Glycol may be capable of or prone to freezing out of solution at a below zero degrees Celsius temperature. For example, in some embodiments, Polypropylene Glycol appears to, at least in part, freeze out of solution in Water-Polypropylene Glycol 2000-Propylene Glycol solutions. Additionally, in some embodiments, Water-Polypropylene Glycol 2000-Propylene Glycol solutions may comprise a multi-liquid phase solution, even below the cloud point temperature range of the solution, which may mean a viscous organic phase may be present in addition to the aqueous phase below the cloud point temperature range.

Some embodiments may benefit from Polypropylene Glycol remaining in an aqueous phase within a solution below a cloud point temperature range. Some embodiments may benefit from a single liquid phase combined solution below a cloud point temperature range. Some embodiments may benefit from a homogenous solution below a cloud point temperature range.

The present embodiment may involve the presence of glycol ethers in solutions comprising Water-Polypropylene Glycol-Freezing Point Depressant. For example, in some embodiments, Diethylene Glycol Hexyl Ether may be employed as a glycol ether additive. In some embodiments, the presence of specific glycol ethers may change the properties of the solution. For example, Water-Polypropylene Glycol 2000-Propylene Glycol-Diethylene Glycol Hexyl Ether solutions may possess a defined cloud point temperature range wherein, for example, when the solution is at a temperature below the cloud point temperature range of the solution, the solution may comprise a single liquid phase combined solution, or a homogenous solution, or a transparent solution, or any combination thereof. In some embodiments, Water-Polypropylene Glycol 2000-Propylene Glycol-Diethylene Glycol Hexyl Ether solutions demonstrate freezing points substantially below the freezing point temperature of Water-Polypropylene Glycol 2000-Propylene Glycol solutions without the presence of Diethylene Glycol Hexyl Ether. In some embodiments, it appears the presence of Diethylene Glycol Hexyl Ether prevents at least a portion of the Polypropylene Glycol 2000 from freezing out of solution.

In some embodiments, the presence of diethylene glycol hexyl ether in the presence of propylene glycol appears to depress the cloud point temperature in addition to depressing the freezing point temperature. In some embodiments, the cloud point temperature and the freezing point temperature decreased with increasing concentration of propylene glycol in solutions comprising Water-Polypropylene Glycol 2000-Propylene Glycol-Diethylene Glycol Hexyl Ether.

Example Range of Compositions:

Water concentration in weight percent may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Polypropylene Glycol concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Freezing Point Depressant (such as a glycol, or diol, or propylene glycol, or ethylene glycol, or other freezing point depressant) concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Diethylene Glycol Hexyl Ether (or other glycol ether) concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Tables

TABLE 2

Freezing Point of Water - PPG 2000 - PG - HEX Solutions

| PG/Water Percent | DI Water (g) | PPG 2000 (g) | HEX (g) | PG (g) | Cloud Point (OC) | Freezing Point (OC) |
|---|---|---|---|---|---|---|
| 0.00% | 29.60 | 8.45 | 1.95 | 0.0 | 4.7 | −1.0 |
| 10.96% | 27.38 | 7.82 | 1.81 | 3.0 | 0.0 | −5.0 |
| 23.17% | 25.90 | 7.39 | 1.71 | 5.0 | −2.2 | −8.0* |
| 33.78% | 23.68 | 6.76 | 1.56 | 8.0 | 7** | −15.0*** |

*At 7.5 C. solid forms on the side of the bottle while the rest of the substance stays clear
**Relative long time to cool substance between −5 C. and −10 C.
***Upon freezing at −15 C., substance heats up to −13 C.
Note:
HEX may comprise Diethylene Glycol Hexyl Ether
PG may comprise propylene glycol
PPG may comprise polypropylene glycol Description of Results The solutions shown in Table 2 comprised multi-liquid phase mixture solutions above their cloud point temperatures or temperature ranges and comprised a single liquid phase combined solution at or below their cloud point temperatures or temperature ranges. Below the cloud point temperature range and above their freezing point, the solutions shown in Table 2 comprised a single liquid phase combined solution which appeared transparent and/or homogenous. The Diethylene Glycol Hexyl Ether appears to make the residual insoluble organic liquid phase at or below a cloud point temperature range in PPG-Water solutions to become soluble in the aqueous phase at or below a cloud point temperature or cloud point temperature range. In some embodiments, other glycol ethers in addition to, or instead of, Diethylene Glycol Hexyl Ether, may be applicable.

In some embodiments, the concentration of about 3.5 wt % Diethylene Glycol Hexyl Ether is required to enable an about 20 wt % solution of PPG 2000 to exhibit a homogenous or transparent single liquid phase combined solution at below a cloud point temperature.

In some embodiments, possessing a liquid-liquid phase transition which may comprise transforming from a homogenous or transparent single liquid phase combined solution to a multi-liquid phase mixture when heated at or above or through a cloud point temperature range and/or which may be reversible, may result in the solution exhibiting a greater effective heat transfer coefficient relative to the equivalent solution without the presence of said liquid-liquid phase transition. In some embodiments, greater effective heat transfer coefficient may result from the lack of residual organic liquid phase below the cloud point temperature resulting from the interaction between HEX and PPG 2000. In some embodiments, without the presence of HEX, PPG 2000+Water may possess a multi-liquid phase to multi-liquid phase liquid-liquid phase transition and/or PPG 2000+ Water may possess a multi-liquid phase mixture below the cloud point temperature. In some embodiments, organic liquid phase in a multi-liquid phase mixture and/or the single liquid phase combined solution may possess a lower viscosity with the presence of HEX, which may improve heat transfer coefficient.

In some embodiments, increasing the concentration of propylene glycol depresses the cloud point temperature of a solution. In the presence of some glycol ethers, the cloud point temperature of a solution comprising polypropylene glycol-water may substantially change with increasing concentration of propylene glycol. For example, in the presence of diethylene glycol hexyl ether, as shown in Table 2, the cloud point temperature was zero degrees Celsius at a 10.96 wt % propylene glycol concentration compared to cloud point temperature of −9.7 degrees Celsius at a 33.78 wt % propylene glycol concentration. In some embodiments, the cloud point temperature may be adjusted by adjusting the concentration of propylene glycol.

The freezing point temperature decreased with increasing propylene glycol concentration. In some embodiments, the entire solution appears to possess a lower freezing point with greater propylene glycol concentration. The presence of Diethylene Glycol Hexyl Ether may prevent polypropylene glycol 2000 from freezing out of solution, or depress the freezing point of polypropylene glycol, or any combination thereof.

A solution comprising Water-Polypropylene Glycol 2000-Diethylene Glycol Hexyl Ether may possess a freezing point below the freezing point of water. For example, as shown in Table 2, the Water-Polypropylene Glycol 2000-Diethylene Glycol Hexyl Ether solution without propylene glycol exhibited a freezing point of about −1 degree Celsius.

The single liquid phase combined solution below the cloud point temperature appeared to exhibit a relatively low viscosity. The stir bar appeared to easily rotate while submerged in the solution. The stir bar was clearly visible while stirring, indicating present solutions may be transparent below a cloud point temperature range.

The solutions appear to possess enhanced effective specific heat capacity or heat capacity near their cloud point temperatures. The enhanced effective specific heat capacity may be due to the enthalpy of liquid-liquid phase transition.

For example, in one example composition, significantly greater time was required to cool from −5 degrees Celsius to −10 degrees Celsius, while significantly less time was required to cool from −10 degrees Celsius to −15 degrees Celsius. The greater time required to cool from −5 degrees Celsius to −10 degrees Celsius compared to cooling from −10 degrees Celsius to −15 degrees Celsius may be due to greater effective specific heat capacity due to, for example, the enthalpy of liquid-liquid phase transition. It is important to note the visual cloud point temperature of the presently described solution was −9.7 degrees Celsius, which is near or within the −5 degrees Celsius to −10 degrees where the potential enhanced heat capacity appeared.

Freezing point experiments were conducted by placing a bottle containing the sample solution in a cold bath comprising dry ice submerged in 60 wt % propylene glycol-water. The temperature of the cold bath was generally between −20 degrees Celsius and −30 degrees Celsius.

Upon reaching a freezing point, some solutions heat up to a temperature greater than the temperature of the solution immediately before freezing. It is important to note that solutions in the present experiments were continuously mixing with a magnetic stir bar throughout freezing point and cloud point experiments, which may prevent supercooling, if any. There appears to be an exothermic phase change which increases the temperature of the medium to a temperature significantly above the temperature before freezing. For example, one solution reached a temperature of about −15 degrees Celsius before freezing, and, upon freezing, the temperature of the solution rapidly or practically instantaneously increased by about 2 degrees Celsius to about −13 degrees Celsius.

Example Applications

Some compositions may be employed in a wide range of applications.

For example, some compositions may be beneficial in applications involving cooling near, or, at, or below, or any combination thereof the temperature of the freezing point of water. For example, some compositions may be useful as a heat transfer medium, or a thermal storage medium, or any combination thereof. For example, some compositions may be useful in providing enhanced heat capacity, or enhanced heat transfer capacity, or enhanced heat transfer capacity rate at temperatures near, or at, or below the freezing point of water.

For example, some compositions may comprise direct replacements of conventional antifreeze in applications employing conventional antifreeze coolants.

For example, some compositions, or portions of some compositions, or any combination thereof may comprise additives to pre-existing propylene glycol-water, or ethylene glycol-water, or glycol-water, or glycerin-water, or any combination thereof solutions in existing or new applications. Employing some compositions, or portions of some compositions, or any combination thereof as additives may enable enhanced heat capacity, or enhanced heat capacity rate, or greater heat transfer, or greater cooling capacity, or greater heating capacity, or greater total heat capacity, or any combination thereof in a pre-existing system.

For example, some compositions may be employed as a heat transfer fluid in an ice making or ice production process. For example, some of the present compositions may be employed as a thermal storage medium in an ice making or ice production process.

For example, some compositions may be employed as a heat transfer medium, or a thermal storage medium, or any combination thereof in an ice slurry making process.

For example, some of the present compositions may be employed in cold chain applications.

For example, some compositions may be employed as a heat transfer medium, or thermal storage medium, or any combination thereof in refrigerating materials, or food, or medical equipment, or medicines, or organs, or vaccines.

For example, some compositions may be employed as a heat transfer medium, or thermal storage medium, or any combination thereof in process cooling applications.

For example, some compositions may be employed as a heat transfer medium, or thermal storage medium, or any combination thereof in high density cooling applications.

For example, some compositions may be employed as a heat transfer medium, or thermal storage medium, or any combination thereof in freezing applications.

For example, some of the present compositions may be employed as a heat transfer medium, or thermal storage medium, or any combination thereof in HVAC applications.

For example, some compositions may be employed as a heat transfer medium, or thermal storage medium, or any combination thereof in gas liquification, or gas solidification, or condensation, or deposition, or sublimination, or LNG liquefaction, or gas processing, or chemical synthesis, or chemical extraction, or freeze desalination, or any combination thereof.

For example, some compositions may be employed as a heat transfer medium, or thermal storage medium, or any combination thereof in cold thermal storage applications.

For example, some compositions may be employed as a heat transfer medium, or thermal storage medium, or any combination thereof in high density computing applications, or high density electronics applications, or any combination thereof.

For example, some compositions may be employed as a heat transfer medium, or thermal storage medium, or any combination thereof in production of ice slurries or solid-liquid slurries.

For example, some compositions may be employed as a heat transfer medium, or thermal storage medium, or any combination thereof in ice making chillers.

For example, some compositions may be employed as a heat transfer medium, or thermal storage medium, or any combination thereof in cold warehouses.

For example, some compositions may be employed as a heat transfer medium, or thermal storage medium, or any combination thereof in refrigeration cycles.

For example, some compositions may be employed as a heat transfer medium, or thermal storage medium, or any combination thereof for cooling magnets, or for cooling batteries, or for cooling electric vehicles, or any combination thereof.

For example, some compositions may be employed as a heat transfer medium, or thermal storage medium, or any combination thereof in cooling ice skating rinks, or for snow making, or any combination thereof.

For example, some compositions may be employed as an absorbent

For example, some compositions may be employed as an absorbent in a physical or chemical separation process.

For example, some compositions may be employed as an absorbent in water vapor extraction, or dehydration, or gas separation, or distillation, or CO2 capture For example, some compositions may be employed as an extractant, or cleaning material, or solvating material, or a material which facilitates dissolution, or any combination thereof.

For example, some compositions may be employed in pumped heat electricity storage. For example, some compositions may be employed as a thermal storage medium in the cold reservoir of a pumped heat electrical storage system.

For example, some compositions may be employed as a heat transfer medium in a pumped heat electricity storage system.

For example, some compositions may be employed as a heat transfer medium in a pumped heat storage system or pumped heat system.

Water-Polypropylene Glycol 1000-Propylene Glycol

Description of Composition

Some embodiments may comprise a composition comprising Water, Polypropylene Glycol, and a freezing point depressant additive which may reduce the freezing point of the solution. In some embodiments, said freezing point depressant additive may comprise, including, but not limited to, one or more or any combination of the following: propylene glycol, or ethylene glycol, or glycol, or glycerin, or urea.

Example Range of Compositions:

Water concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Polypropylene Glycol concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Freezing Point Depressant concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Some embodiments may comprise Water-Polypropylene Glycol-Propylene Glycol. For example, some compositions may comprise Water-Polypropylene Glycol 1000-Propylene Glycol.

In some embodiments, some of the present compositions may exhibit an enthalpy of liquid-liquid phase transition in a temperature range above the freezing point of water. In some embodiments, some of the present compositions may exhibit an enthalpy of liquid-liquid phase transition in a temperature range between 5 degrees Celsius and 25 degrees Celsius. In some embodiments, some of the present compositions may exhibit an enthalpy of liquid-liquid phase transition in a temperature range between 5 degrees Celsius and 35 degrees Celsius. In some embodiments, some of the present compositions may exhibit an enthalpy of liquid-liquid phase transition in a temperature range between 10 degrees Celsius and 25 degrees Celsius.

In some embodiments, some of the present compositions may comprise a single liquid phase combined solution below the cloud point temperature range and/or said single liquid phase combined solution may be transparent. In some embodiments, some of the present compositions may comprise a lower viscosity. For example, some compositions comprising Polypropylene Glycol 1000 may possess a lower viscosity than some compositions comprising Polypropylene Glycol 2000, wherein the organic liquid phase at a multi-liquid phase state, or the aqueous phase at a single liquid phase combined solution state, or wherein the aqueous phase at a multi-liquid phase state, or any combination thereof may possess a lower viscosity.

Tables

TABLE 3

Freezing Point of Water - PPG 1000 - PG Solutions

| Solution ID | PG/Water Percent | DI Water (g) | PPG P1000 (g) | PPG avg. MW ~1000 (g) | Propylene Glycol (g) | Cloud Point (degrees Celsius) | Freezing Point (degrees Celsius) |
|---|---|---|---|---|---|---|---|
| 326 | 0% | 60 | 20 | 0 | 0 | 13 | −1.1 |
| 329 | 10.81% | 55.5 | 18.5 | 0 | 6 | 13 | −3.8 |
| 332 | 23.53% | 51 | 17 | 0 | 12 | 13 | −5.3 |
| 334A | 33.33% | 48 | 0 | 16 | 16 | 8 | −12 |
| 334P | 33.33% | 48 | 16 | 0 | 16 | 9.6 | −10 |
| 335 | 38.71% | 46.5 | 15.5 | 0 | 18 | | |
| 336 | 44.44% | 45 | 15 | 0 | 20 | | |

TABLE 4

Average Effective Specific Heat Capacity of Solutions (from Table 3) relative to the Specific Heat Capacity of DI Water in Defined Temperature Ranges

| | 326 | 329 | 332 | 334A | 334P | 335 | 336 |
|---|---|---|---|---|---|---|---|
| Average Specific Heat Capacity 7° C.-12° C. | 99.3% | | 110.38% | 97.83% | 110.13% | 93.49% | 96.67% |
| Average Specific Heat Capacity 10° C.-30° C. | 123.4% | | 108.06% | 98.43% | 111.75% | 95.56% | 94.58% |
| Average Specific Heat Capacity 12° C.-20° C. | 137.25% | | 111.74% | 100.28% | 116.32% | 100.77% | 97.32% |
| Average Specific Heat Capacity 6° C.-10.9° C. | 97.04% | | 106.77% | 95.54% | 104.66% | 94.96% | 93.27% |
| Average Specific Heat Capacity 11° C.-15.9° C. | 130.48% | | 112.01% | 99.91% | 113.30% | 98.73% | 96.08% |
| Average Specific Heat Capacity 16° C.-20.9° C. | 134.19% | | 109.64% | 97.32% | 113.79% | 97.57% | 98.50% |
| Average Specific Heat Capacity 21° C.-25.9° C. | | | 105.83% | 101.71% | 116.36% | 93.15% | 91.59% |
| Average Specific Heat Capacity 26° C.-30.9° C. | | | 104.25% | 95.44% | 102.47% | 93.15% | 93.21% |

TABLE 5

Average Effective Specific Heat Capacity of Solutions (from Table 3) relative to the Specific Heat Capacity of 30 wt % Propylene Glycol - Water in Defined Temperature Ranges

|  | 326 | 329 | 332 | 334A | 334P | 335 | 336 |
|---|---|---|---|---|---|---|---|
| Average Specific Heat Capacity 7° C.-12° C. | 106.21% |  | 118.06% | 104.64% | 117.79% | 99.99% | 103.39% |
| Average Specific Heat Capacity 10° C.-30° C. | 131.98% |  | 115.57% | 105.27% | 119.52% | 102.20% | 101.15% |
| Average Specific Heat Capacity 12° C.-20° C. | 146.79% |  | 119.51% | 107.25% | 124.41% | 107.78% | 104.09% |
| Average Specific Heat Capacity 6° C.-10.9° C. | 103.79% |  | 114.19% | 102.18% | 111.93% | 101.56% | 99.75% |
| Average Specific Heat Capacity 11° C.-15.9° C. | 139.55% |  | 119.80% | 106.86% | 121.18% | 105.59% | 102.75% |
| Average Specific Heat Capacity 16° C.-20.9° C. | 143.52% |  | 117.27% | 104.08% | 121.70% | 104.35% | 105.35% |
| Average Specific Heat Capacity 21° C.-25.9° C. |  |  | 113.19% | 108.78% | 124.45% | 99.62% | 97.96% |
| Average Specific Heat Capacity 26° C.-30.9° C. |  |  | 111.50% | 102.07% | 109.59% | 99.62% | 99.69% |

Description of Results

The solutions shown in Table 3 appeared to comprise multi-liquid phase mixture solutions above their cloud point temperatures or temperature ranges and a single liquid phase combined solution at or below their cloud point temperatures or temperature ranges. Below the cloud point temperature range and above their freezing point, the solutions shown in Table 2 comprised a single liquid phase combined solution which appeared transparent and/or homogenous.

A significant portion of the enthalpy of liquid-liquid phase transition appears to occur at a temperature above the cloud point temperature for some compositions. For example, solution 326 in Table 3 has a cloud point temperature of about 13 degrees Celsius, while a large portion of the enthalpy of liquid-liquid phase transition appears to occur above 13 degrees.

In some compositions, heat capacity appears to be enhanced over an at least 15 degree K temperature range.

The presence of propylene glycol in water-polypropylene glycol P1000 solutions appears to reduce the temperature range of the enthalpy of liquid-liquid phase transition or provide enhanced heat capacity in a lower temperature range compared to water-polypropylene glycol P1000 solutions without propylene glycol. For example, solutions 332 and 334P, both which comprise propylene glycol, exhibited a significantly greater effective specific heat capacity in 7° C.-12° C. than solution 326, which did not comprise propylene glycol, while solution 326 exhibited substantially greater effective specific heat capacity in the temperature range of 12° C.-20° C. than solutions 332 and 334P.

Increasing concentration of propylene glycol reduced overall specific heat capacity. Advantageously, the effective specific heat capacity of Water-Polypropylene Glycol 1000-Propylene Glycol compositions, in the temperature of the enthalpy of liquid-liquid phase transition, are greater than the specific heat capacity of Water-Propylene Glycol compositions with equivalent freezing points.

Water-Polypropylene Glycol 1000 alone possesses a slightly depressed freezing point, with a freezing point of about −1.1 degrees Celsius.

Greatest effective specific heat capacity enhancement appears may have occurred between 12 degrees Celsius and 20 degrees Celsius.

The effective specific heat capacity of compositions with Polypropylene Glycol with an average molecular weight of 1,000 were substantially different from the effective specific heat capacity of compositions with Polypropylene Glycol P1000. For example, in solution 334, the composition with Polypropylene Glycol P1000 possessed an effective specific heat capacity at least 10% greater than the compositions with Polypropylene Glycol with an average molecular weight of 1,000 in the temperature range of 10 degrees Celsius to 25 degrees Celsius.

Example Applications

The present compositions may be employed in a wide range of applications.

In some embodiments, some compositions may be applicable to, for example, applications which require freeze point depression or freezing protection, while benefiting from specific heat capacity enhancement in temperature ranges greater than the freezing point of water.

Advantageously, some compositions may be practically non-toxic, or practically non-flammable, or practically non-volatile, or any combination thereof.

Temperature range of enhanced effective specific heat capacity is applicable to a wide range of applications.

Some compositions may be applicable to a wide range of applications, which may include, but are not limited to, one or more or any combination of the following:

Data center chilled water systems
Electric vehicles, especially electric vehicles with liquid cooled battery management or thermal management systems
HVAC
Industrial processes
Chilled water systems
Cold packs
Cold chain
Refrigeration
Solar Panel Cooling
Electricity storage
Grid scale electricity storage
Battery thermal management systems
High-power electronics
Vehicle cooling systems
Engine coolant
Process cooling
Compressor cooling
Vertical Takeoff and Landing Aircraft (VTOL)
Electric airplanes Liquid cooled electric charging cables
Manufacturing
Pharmaceuticals
Glycol dehydration systems
Gas separation
Absorption
Desorption For example, Lithium-Ion batteries generally have a preferred operating temperature between 16-27 degrees Celsius. In electric cars, for example, a battery thermal management system may employ an antifreeze coolant to maintain battery cell temperatures near an optimal operating temperature, which may enable, for example, more energy efficient charging and discharging, or longer battery longevity, or greater battery power capacity, or greater battery energy capacity, or reduced rates of degradation, or any combination thereof. In an electric vehicle, the coolant occupies a significant amount of weight and space within a battery pack. In some embodiments, employing one or more or any combination of compositions introduced herein or a composition which possesses a greater specific heat capacity in may reduce the required weight and volume of heat transfer fluid in the battery back, which may improve energy efficiency, or enable greater battery pack energy density, or reduce vehicle weight, or any combination thereof. In some embodiments, employing one or more or any combination of compositions introduced herein or a composition which possesses a greater specific heat capacity may enable the use of smaller supply return temperature differences for the same amount of heat transfer or same heat capacity rate, which may improve battery management system energy efficiency. In some embodiments, employing one or more or any combination of compositions introduced herein or a composition which possesses a greater specific heat capacity may enable greater or faster charging or discharging rates, which may enable faster battery charging, or may enable higher battery power output, or may enable more prolonged battery output, or any combination thereof. Advantageously, some compositions employed herein may possess enhanced effective specific heat capacity in the temperature range preferred by Lithium-Ion batteries, while also providing freezing point protection or a freezing point significantly below the freezing point of water.

In regions with colder climates, commercial buildings, HVAC applications, and other applications involve cooling or heating with water generally require the water to be mixed with a minimum of 25 wt % glycol antifreeze or a freezing point temperature less than or equal to −10° C. Advantageously, some compositions herein provide enhanced effective specific heat capacity in the desired operating temperature of most chilled water systems, while providing freezing point protection down to temperatures less than or equal to −10° C. Some compositions herein may increase the total heat carrying capacity in operating temperature ranges, while also providing freezing protection or lower freezing point.

Some compositions introduced herein may comprise direct alternatives or replacements for glycol-water antifreeze. Some compositions or components or parts of some compositions introduced herein may comprise additives to glycol-water antifreeze, which may enhance the effective specific heat capacity of pre-existing glycol-water antifreeze.

In refrigeration systems, such as commercial refrigeration systems employed in cold chain applications, systems generally cool to about 2-4 degrees Celsius. Some compositions herein may provide enhanced heat capacity or heat transfer in the temperature range of cooling or heat transfer, while also possessing a sufficiently low freezing point.

Water-Polypropylene Glycol 1200-Propylene Glycol

Description of Composition

Some embodiments may comprise a composition comprising Water, Polypropylene Glycol, and a freezing point depressant additive which may reduce the freezing point of the solution. In some embodiments, said freezing point depressant additive may comprise, including, but not limited to, one or more or any combination of the following: propylene glycol, or ethylene glycol, or glycol, or glycerin, or urea.

Example Range of Compositions:

Water concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Polypropylene Glycol concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Freezing Point Depressant concentration may be less than, or greater than, or equal to, one or more or any combination of the following: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Some embodiments may comprise Water-Polypropylene Glycol-Propylene Glycol. For example, some compositions may comprise Water-Polypropylene Glycol 1200-Propylene Glycol.

In some embodiments, some of the present compositions may exhibit an enthalpy of liquid-liquid phase transition in a temperature range above the freezing point of water. In some embodiments, some of the present compositions may exhibit an enthalpy of liquid-liquid phase transition in a temperature range between 5 degrees Celsius and 25 degrees Celsius. In some embodiments, some of the present compositions may exhibit an enthalpy of liquid-liquid phase transition in a temperature range between 5 degrees Celsius and 35 degrees Celsius. In some embodiments, some of the present compositions may exhibit an enthalpy of liquid-liquid phase transition in a temperature range between 10 degrees Celsius and 25 degrees Celsius.

In some embodiments, some of the present compositions may comprise a single liquid phase combined solution below the cloud point temperature range and/or said single liquid phase combined solution may be transparent. In some embodiments, some of the present compositions may comprise a lower viscosity. For example, some compositions comprising Polypropylene Glycol 1200 may possess a lower viscosity than some compositions comprising Polypropylene Glycol 2000, wherein the organic liquid phase at a multi-liquid phase state, or the aqueous phase at a single liquid phase combined solution state, or wherein the aqueous phase at a multi-liquid phase state, or any combination thereof may possess a lower viscosity.

Tables

TABLE 6

Freezing Point of Water - PPG 1200 - PG Solutions

| Solution ID | PG/Water Percent | DI Water (g) | PPG P1200 (g) | Propylene Glycol (g) | Cloud Point (degrees Celsius) | Freezing Point (degrees Celsius) |
| --- | --- | --- | --- | --- | --- | --- |
| 343 | 23.53% | 51 | 17 | 12 | 4.9 | −10 |
| 345 | 33.33% | 48 | 16 | 16 | 4.8 | −13 |

TABLE 7

Average Effective Specific Heat Capacity of Solutions (from Table 6) relative to the Specific Heat Capacity of DI Water in Defined Temperature Ranges

|  | 343 | 345 |
| --- | --- | --- |
| Average Specific Heat Capacity 7° C.-12° C. | 110.35% | 101.91% |
| Average Specific Heat Capacity 10° C.-30° C. | 102.45% | 96.96% |
| Average Specific Heat Capacity 12° C.-20° C. | 109.25% | 100.03% |
| Average Specific Heat Capacity 6° C.-10.9° C. | 107.34% | 102.67% |
| Average Specific Heat Capacity 11° C.-15.9° C. | 113.85% | 104.92% |
| Average Specific Heat Capacity 16° C.-20.9° C. | 102.99% | 96.95% |
| Average Specific Heat Capacity 21° C.-25.9° C. | 99.83% | 96.31% |
| Average Specific Heat Capacity 26° C.-30.9° C. | 93.72% | 91.28% |

TABLE 8

Average Effective Specific Heat Capacity of Solutions (from Table 6) relative to the Specific Heat Capacity of 30 wt % Propylene Glycol in Defined Temperature Ranges

|  | 343 | 345 |
| --- | --- | --- |
| Average Specific Heat Capacity 7° C.-12° C. | 118.02% | 108.99% |
| Average Specific Heat Capacity 10° C.-30° C. | 109.57% | 103.70% |
| Average Specific Heat Capacity 12° C.-20° C. | 116.85% | 106.99% |
| Average Specific Heat Capacity 6° C.-10.9° C. | 114.80% | 109.81% |
| Average Specific Heat Capacity 11° C.-15.9° C. | 121.76% | 112.21% |
| Average Specific Heat Capacity 16° C.-20.9° C. | 110.14% | 103.69% |
| Average Specific Heat Capacity 21° C.-25.9° C. | 106.77% | 103.01% |
| Average Specific Heat Capacity 26° C.-30.9° C. | 100.24% | 97.63% |

Description of Results

For some compositions, the effective specific heat capacity enhancement relative to water may be greater in temperature ranges lower than the temperature ranges shown in Table 7 and Table 8. For example, for 343 and 345 shown in Tables 6-8, the effective specific heat capacity enhancement may be greater in temperature ranges less than 7 degrees Celsius.

Example Applications

Applications may be similar to the applications of other compositions introduced herein.

Filtering or Selectively Removing Second Liquid Phase from Solutions Below Cloud Point Temperature Description:

In some embodiments, a liquid-liquid phase transition composition below its cloud point temperature range may comprise a single liquid phase combined solution aqueous phase in a mixture with an organic liquid phase. In some embodiments, said organic liquid phase present below the cloud point temperature may possess a viscosity substantially greater than the viscosity of the aqueous phase. In some embodiments, said organic liquid phase appears to have substantially similar or about the same density as the single liquid phase combined solution aqueous phase because it may appear suspended or dispersed and/or may generally remain suspended or dispersed, even over extended residence time.

Examples of compositions with said organic liquid phase present below a cloud point temperature may include, but are not limited to, one or more or any combination of the following: some compositions comprising PPG 1200, or PPG 2000, or PPG 2700, or PPG 3000, or PPG P, or PPG Avg. molecular weight, or water, or any combination thereof.

In some embodiments, the presence of said organic liquid phase present below a cloud point temperature may be beneficial. For example, said organic liquid present below a cloud point temperature may, including, but not limited to, one or more or any combination of the following: improve heat capacity, or improve heat transfer, or have a non-thermal property benefit.

In some embodiments the presence of said organic liquid phase present below a cloud point temperature may reduce performance in or inhibit some applications. For example, in some embodiments, the presence of said organic liquid phase present below a cloud point temperature may, including, but not limited to, one or more or any combination of the following: reduce heat capacity, or reduce heat transfer coefficient, or clog heat exchangers, or restrict flow in pipes, or restrict flow in heat exchangers, or increase required pressure drop for pumping, or reduce heat transfer performance, or undesirably accumulate in some system components.

In some embodiments, it may be desirable to remove organic liquid phase present below a cloud point temperature before installing a composition in an application. In some embodiments, it may be desirable to remove organic liquid phase below a cloud point temperature after installation a composition in an application.

In some embodiments, after the separation or removal of at least a portion of the organic liquid phase present below a cloud point temperature, the remaining liquid-liquid phase transition composition or the remaining solution may comprise a significantly lower concentration or amount of the compounds comprising said organic liquid phase. In some embodiments, the remaining solution after separation of at least a portion of the organic liquid phase may be heated above the cloud point temperature range and, in some embodiments, when cooled below the cloud point temperature range, may comprise a single liquid phase combined solution without or with a significantly lower concentration of organic liquid phase present below a cloud point temperature.

In some embodiments, at least a portion of an organic liquid phase present below a cloud point temperature may be separated using density-based separation. For example, at least a portion of an organic liquid phase present below a cloud point temperature may be separated using, including, but not limited to, one or more or any combination of the following: centrifuge, or decanter, or pipe separator, or coalescer, or any combination thereof.

In some embodiments, the density of organic liquid phase present below a cloud point temperature may be similar or about the same as other components.

In some embodiments, techniques may be employed alter the density of the organic liquid phase present below the cloud point temperature relative to the density of the aqueous liquid phase. Some embodiments may involve employing microwaves tuned to desired wave lengths which may selectively heat the organic liquid phase present below the cloud point temperature, which may result in a reduction in density due to increase in temperature and may facilitate or enable density based separation of the organic liquid phase present below the cloud point temperature.

In some embodiments, the chemical component may be purified before introduction into the composition or formation of the composition. For example, PPG 2000 may be further filtered or purified or selectively treated to prevent or minimize the presence of chemicals or components which may result in the formation of organic liquid phase present below a cloud point temperature. In some embodiments, the synthesis or production of the chemical may be altered or tuned.

In some embodiments, the organic liquid phase present below a cloud point temperature may possess different polarity, or electrostatic properties, or charge, or adherence, or any combination thereof than the aqueous liquid phase, which may be utilized to separate the organic liquid phase present below a cloud point temperature from the aqueous liquid phase.

For example, a coalescing material may facilitate the aggregation of organic liquid phase present below a cloud point temperature, and the aggregated organic liquid phase droplets may be selectively removed using, for example, a tube or a tube with an opening which is positioned near, or on, or inside said droplets.

For example, a solution below a cloud point temperature may be transferred through a container or pipe which may comprise a surface which favorably adheres to the organic liquid phase. The organic liquid phase may eventually adhere to or coat the surface of the container or pipe. In some embodiments, small holes or pores in the container or pipe wall may remove or transfer organic liquid phase from the pipe, successfully removing at least a portion of the organic liquid phase from the aqueous liquid phase.

In some embodiments, the organic liquid phase present below a cloud point temperature may possess a substantially different viscosity than the aqueous liquid phase, which may be utilized to separate the organic liquid phase present below a cloud point temperature from the aqueous liquid phase.

In some embodiments, a viscous liquid may travel through or past a material or medium at a different rate than a less viscous or a liquid with different properties than the viscous liquid, or any combination thereof.

In some embodiments, viscosity gradients may be employed to separate the organic liquid phase from the aqueous liquid phase.

In some embodiments, the viscous liquid phase may be at least partially filtered from the aqueous liquid phase Separations may utilize, including, but not limited to, one or more or any combination of the following:

Hydrophobicity

Hydrophilicity

Surface properties

Electrostatic properties

Polarity

Density

Viscosity

Aggregation

Coagulation

Floatation

Bubble Floatation

Frothing

Manual removal of droplets

Selective removal of droplets

Surface tension

Extractive separation

Filtration

Purification

Thermal Properties

Absorbance Spectra

Microwave absorbance

Adherence to magnetic particles and/or separation with magnetism

Separation may involve mixing with a liquid, or gas, or supercritical fluid

Separation may involve mixing with a liquid, or gas, or supercritical fluid, or any combination thereof which may result in the separation of or dissolution of organic liquid phase present below a cloud point temperature from the aqueous liquid phase.

TABLE 9

Freezing Point of Water - PPG 1000 - PG Solutions

| Solution ID | EG/Water Percent | DI Water (g) | PPG P1000 (g) | Ethylene Glycol (g) | Cloud Point (degrees Celsius) | Freezing Point (degrees Celsius) |
|---|---|---|---|---|---|---|
| 359 | 10.81% | 55.5 | 18.5 | 6.0 | — | −6.5 |
| 360 | 23.53% | 51.0 | 17.0 | 12.0 | — | −15.0 |
| 361 | 33.33% | 48.0 | 16.0 | 16.0 | — | −16.0 |
| 362 | 44.44% | 45.0 | 15.0 | 20.0 | — | −21.0 |

TABLE 10

Average Effective Specific Heat Capacity of Solutions (from Table 9) relative to the Specific Heat Capacity of DI Water in Defined Temperature Ranges

|  | 359 | 360 | 361 | 362 |
|---|---|---|---|---|
| Average Specific Heat Capacity 7° C.-12° C. | 101.50% | 106.76% | 108.59% | 102.58% |
| Average Specific Heat Capacity 10° C.-30° C. | 114.21% | 108.94% | 101.90% | 96.76% |
| Average Specific Heat Capacity 12° C.-20° C. | 124.54% | 114.91% | 104.92% | 98.32% |
| Average Specific Heat Capacity 6° C.-10.9° C. | 98.31% | 104.86% | 110.75% | 100.06% |
| Average Specific Heat Capacity 11° C.-15.9° C. | 114.02% | 116.79% | 106.10% | 103.61% |
| Average Specific Heat Capacity 16° C.-20.9° C. | 128.39% | 112.70% | 104.65% | 98.07% |
| Average Specific Heat Capacity 21° C.-25.9° C. | 121.78% | 109.47% | 103.09% | 100.06% |
| Average Specific Heat Capacity 26° C.-30.9° C. | 129.20% | 117.87% | 91.72% | 86.33% |

TABLE 11

Average Effective Specific Heat Capacity of Solutions (from Table 9) relative to the Specific Heat Capacity of wt % Ethylene Glycol in Defined Temperature Ranges

|  | 359 | 360 | 361 | 362 |
|---|---|---|---|---|
| Average Specific Heat Capacity 7° C.-12° C. | 104.42% | 111.90% | 113.83% | 121.25% |
| Average Specific Heat Capacity 10° C.-30° C. | 117.50% | 114.20% | 106.81% | 114.38% |
| Average Specific Heat Capacity 12° C.-20° C. | 128.12% | 120.45% | 109.98% | 116.22% |
| Average Specific Heat Capacity 6° C.-10.9° C. | 101.14% | 109.92% | 116.09% | 118.27% |
| Average Specific Heat Capacity 11° C.-15.9° C. | 117.31% | 122.42% | 111.21% | 122.47% |
| Average Specific Heat Capacity 16° C.-20.9° C. | 132.08% | 118.13% | 109.69% | 115.92% |
| Average Specific Heat Capacity 21° C.-25.9° C. | 125.28% | 114.75% | 108.06% | 118.27% |
| Average Specific Heat Capacity 26° C.-30.9° C. | 132.92% | 123.55% | 96.14% | 102.05% |

TABLE 12

Freezing Point of Water - PPG 1000 - PG Solutions

| Solution ID | EG/Water Percent | DI Water (g) | PPG P1000 (g) | Ethylene Glycol (g) | Cloud Point (degrees Celsius) | Freezing Point (degrees Celsius) |
|---|---|---|---|---|---|---|
| 363 | 57.14% | 42.0 | 14.0 | 24.0 | — | −26.5 |
| 364 | 71.79% | 39.0 | 13.0 | 28.0 | — | −31.0 |
| 365 | 88.89% | 36.0 | 12.0 | 32.0 | — | −38.5 |

TABLE 13

Average Effective Specific Heat Capacity of Solutions (from Table 12) relative to the Specific Heat Capacity of DI Water in Defined Temperature Ranges

|  | 363 | 364 | 365 |
|---|---|---|---|
| Average Specific Heat Capacity 7° C.-12° C. | 96.32% | 90.62% | 86.80% |
| Average Specific Heat Capacity 10° C.-30° C. | 91.20% | 87.31% | 89.10% |
| Average Specific Heat Capacity 12° C.-20° C. | 94.72% | 87.82% | 88.49% |
| Average Specific Heat Capacity 6° C.-10.9° C. | 97.94% | 95.45% | 89.14% |
| Average Specific Heat Capacity 11° C.-15.9° C. | 96.56% | 90.61% | 84.83% |
| Average Specific Heat Capacity 16° C.-20.9° C. | 93.14% | 84.76% | 91.10% |
| Average Specific Heat Capacity 21° C.-25.9° C. | 91.92% | 90.00% | 97.41% |
| Average Specific Heat Capacity 26° C.-30.9° C. | 85.94% | 83.62% | 85.12% |

TABLE 14

Average Effective Specific Heat Capacity of Solutions (from Table 12) relative to the Specific Heat Capacity of wt % Ethylene Glycol in Defined Temperature Ranges

|  | 363 | 364 | 365 |
|---|---|---|---|
| Average Specific Heat Capacity 7° C.-12° C. | 120.70% | 114.27% | 118.25% |
| Average Specific Heat Capacity 10° C.-30° C. | 114.28% | 110.10% | 121.39% |
| Average Specific Heat Capacity 12° C.-20° C. | 118.70% | 110.75% | 120.56% |

TABLE 14-continued

Average Effective Specific Heat Capacity of Solutions
(from Table 12) relative to the Specific Heat Capacity
of wt % Ethylene Glycol in Defined Temperature Ranges

|  | 363 | 364 | 365 |
|---|---|---|---|
| Average Specific Heat Capacity 6° C.-10.9° C. | 122.73% | 120.36% | 121.44% |
| Average Specific Heat Capacity 11° C.-15.9° C. | 121.01% | 114.27% | 115.58% |
| Average Specific Heat Capacity 16° C.-20.9° C. | 116.72% | 106.89% | 124.12% |
| Average Specific Heat Capacity 21° C.-25.9° C. | 115.19% | 113.49% | 132.71% |
| Average Specific Heat Capacity 26° C.-30.9° C. | 107.69% | 105.44% | 115.96% |

TABLE 15

Freezing Point of Water-PPG 425-PG Solution

| Solution ID | DI Water(g) | PPG P425 (g) |
|---|---|---|
| 380 | 60.0 | 20.0 |

TABLE 16

Average Effective Specific Heat Capacity of Solutions
(from Table 15) relative to the Specific Heat Capacity
of DI Water in Defined Temperature Ranges

|  | 380 |
|---|---|
| Average Specific Heat Capacity 40° C.-44.9° C. | 97.00% |
| Average Specific Heat Capacity 45° C.-49.9° C. | 101.46% |
| Average Specific Heat Capacity 50° C.-54.9° C. | 108.45% |
| Average Specific Heat Capacity 55° C.-59.9° C. | 104.38% |

TABLE 17

Freezing Point of Water-PPG 725-PG Solution

| Solution ID | DI Water(g) | PPG P725 (g) |
|---|---|---|
| 381 | 60.0 | 20.0 |

TABLE 18

Average Effective Specific Heat Capacity of Solutions
(from Table 17) relative to the Specific Heat Capacity
of DI Water in Defined Temperature Ranges

|  | 381 |
|---|---|
| Average Specific Heat Capacity 20° C.-24.9° C | 108.81% |
| Average Specific Heat Capacity 25° C.-29.9° C | 124.49% |
| Average Specific Heat Capacity 30° C.-34.9° C | 115.49% |
| Average Specific Heat Capacity 35° C.-30.9° C | 106.40% |
| Average Specific Heat Capacity 40° C.-44.9° C | 101.91% |
| Average Specific Heat Capacity 45° C.-49.9° C | 93.71% |

Notes

Molecular weights of polypropylene glycol may include, but are not limited to, greater than or less than or equal to one or more or any combination of the following: 200, or 400, or 425, or 725, or 1000, or 1200, or 2000, or 2700, or 3000, or 3500, or 4000

In some embodiments, polyethylene glycol, or block polymers of comprising polyethylene glycol and polypropylene glycol, or any combination thereof may be employed instead of or in addition to polypropylene glycol.

Some embodiments may employ a polymer of an average molecular weight, or a 'P' polymer, or a polymer of a single molecular weight, or polymers of multiple molecular weights, or any combination thereof.

Example Exemplary Embodiments

1. A process for removing a portion of a chemical from a heat transfer loop comprising:
    Adding solvent to the heat transfer fluid in a heat transfer loop;
    Removing at least a portion of the heat transfer fluid from the heat transfer loop;
    Separating said removed heat transfer fluid into a permeate and a retentate using a membrane-based process;
    Adding the permeate to the heat transfer fluid in the heat transfer loop; and
    Storing the retentate.
2. The process of example embodiment 1 wherein the retentate comprises a solution of chemical and solvent.
3 (opt 1). The process of example embodiment 1 further comprising:
    Separating the retentate into a separate first liquid phase and a second liquid phase;
    Adding first liquid phase to the heat transfer loop;
    Storing second liquid phase; and
    Wherein the first liquid phase comprises solvent and the second liquid phase comprises chemical.
3 (opt 2). The process of example embodiment 1 further comprising:
    Heating the retentate to a temperature at or above its liquid-liquid phase transition temperature range to form a multi-liquid phase solution comprising a first liquid phase and a second liquid phase;
    Separating the first liquid phase from the second liquid phase;
    Adding first liquid phase to the heat transfer loop;
    Storing second liquid phase; and
    Wherein the first liquid phase comprises solvent and the second liquid phase comprises chemical.
4. The process of example embodiment 3 wherein separating the first liquid phase from the second liquid phase comprises:
    Allowing the first liquid phase and the second liquid phase to settle into a first liquid layer and a second liquid layer in a tank;
    Separating the first liquid layer from the second liquid layer by means of decanting.
5. The process of example embodiment 3 further comprising purifying the first liquid phase comprising solvent by removing residual chemical using a membrane-based process.
6. The process of example embodiment 3 further comprising:
    Transferring the first liquid phase into a second membrane-based process to form a second permeate and a second retentate;
    Wherein the second retentate comprises residual chemical;
    Wherein the second permeate comprises solvent; and
    Adding the second permeate to the heat transfer loop; and Mixing the second retentate with the first retentate before the first membrane-based process.

_. The process of example embodiment 1 wherein the portion of removed heat transfer fluid is cooled to a temperature below an LCST cloud point temperature or heated above an UCST cloud point temperature to ensure the heat transfer fluid comprises a single liquid phase before separating in the membrane-based process.

7. The process of example embodiment 6 wherein the first liquid phase is cooled to a temperature below the cloud point temperature of the second retentate at the concentrate of chemical in the second retentate before transferring the first liquid phase into a membrane-based process.

8. The process of example embodiment 1 wherein the permeate comprises solvent.

9. The process of example embodiment 1 wherein the heat transfer fluid is cooled to below its cloud point temperature before entering the membrane-based process.

10. The process of example embodiment 1 wherein the solvent comprises water.

11. The process of example embodiment 1 wherein the chemical comprises a polypropylene glycol.

12. The process of example embodiment 1 wherein the membrane-based process comprises reverse osmosis, or nanofiltration, or organic solvent nanofiltration, or ultrafiltration, or microfiltration, or forward osmosis, or osmotically assisted reverse osmosis, or osmotically assisted nanofiltration.

13. The process of example embodiment 1 wherein the concentration of chemical in the heat transfer loop is monitored.

14. The process of example embodiment 1 wherein the addition of solvent and removal of heat transfer fluid is stopped when the concentration of chemical in the heat transfer loop is at or below a desired concentration.

15. The process of example embodiment 1 wherein the volume of solvent added is about the same as the volume of chemical removed.

16. The process of example embodiment 1 wherein the volume of liquid added and removed is controlled to ensure the heat transfer loop maintains a desired volume of heat transfer fluid.

17. A process for adding a portion of a chemical to a heat transfer loop comprising:
    Adding chemical to the heat transfer fluid in a heat transfer loop;
    Removing at least a portion of the heat transfer fluid from the heat transfer loop;
    Separating said removed heat transfer fluid into a permeate and a retentate using a membrane-based process;
    Adding the retentate to the heat transfer fluid in the heat transfer loop; and
    Storing the permeate.

18. The process of example embodiment 17 wherein the retentate comprises chemical.

19. The process of example embodiment 17 wherein the permeate comprises solvent.

20. The process of example embodiment 17 wherein the permeate comprises solvent.

21. The process of example embodiment 17 wherein the addition of chemical and removal of heat transfer fluid is stopped when the concentration of chemical in the heat transfer loop is at or below a desired concentration.

22. The process of example embodiment 17 wherein the volume of chemical added is about the same as the volume of solvent removed.

23. The process of example embodiment 17 wherein the volume of liquid added and removed is controlled to ensure the heat transfer loop maintains a desired volume of heat transfer fluid.

24. A process for replacing a first chemical with a second chemical in a heat transfer loop comprising:
    Adding a second chemical to the heat transfer fluid in a heat transfer loop;
    Removing at least a portion of the heat transfer fluid from the heat transfer loop;
    Separating said removed heat transfer fluid into a permeate and a retentate using a membrane-based process;
    Adding the retentate to the heat transfer fluid in the heat transfer loop; and
    Storing the permeate.

25. The process of example embodiment 24 wherein the permeate comprises first chemical and the retentate comprises second chemical.

26. The process of example embodiment 24 wherein the membrane-based process comprises nanofiltration with a membrane pore size sufficiently large to allow the permeation of the first chemical and sufficiently small to allow the rejection of the second chemical.

27. The process of example embodiment 24 further comprising:
    Heating the permeate to a temperature at or above its liquid-liquid phase transition temperature range to form a multi-liquid phase solution comprising a first liquid phase and a second liquid phase;
    Separating the first liquid phase from the second liquid phase;
    Storing first liquid phase and second liquid phase; and
    Wherein the first liquid phase comprises solvent and the second liquid phase comprises first chemical.

28. The process of example embodiment 24 wherein the liquid-liquid phase transition temperature range of a composition comprising first chemical and solvent is different than the liquid-liquid phase transition temperature range of a composition comprising second chemical and solvent.

29. A process for replacing a second chemical with a first chemical in a heat transfer loop comprising:
    Adding a first chemical to the heat transfer fluid in a heat transfer loop;
    Removing at least a portion of the heat transfer fluid from the heat transfer loop;
    Separating said removed heat transfer fluid into a permeate and a retentate using a membrane-based process;
    Adding the permeate to the heat transfer fluid in the heat transfer loop; and
    Storing the retentate.

30. The process of example embodiment 29 further comprising:
    Heating the retentate to a temperature at or above its liquid-liquid phase transition temperature range to form a multi-liquid phase solution comprising a first liquid phase and a second liquid phase;
    Separating the first liquid phase from the second liquid phase;
    Storing first liquid phase and second liquid phase; and
    Wherein the first liquid phase comprises solvent and the second liquid phase comprises second chemical.

A process for installing a chemical which enhances the effective heat capacity of a heat transfer fluid to a heat transfer loop:
   Adding chemical to the heat transfer fluid in a heat transfer loop;
   Separating at least a portion of heat transfer fluid into a permeate and a retentate using a membrane-based process;
   Adding the retentate to the heat transfer fluid in the heat transfer loop;
   Storing the permeate.

A process for installing a chemical which enhances the effective heat capacity of a heat transfer fluid to a heat transfer loop:
   Adding chemical to the heat transfer fluid in a heat transfer loop;
   Removing at least a portion of the heat transfer fluid from the heat transfer loop;
   Separating said removed heat transfer fluid into a permeate and a retentate using a membrane-based process;
   Adding the retentate to the heat transfer fluid in the heat transfer loop;
   Storing the permeate.

Wherein the heat transfer fluid comprises water
Wherein the heat transfer fluid comprises a solvent
Wherein the heat transfer fluid comprises a liquid-liquid phase transition composition when the chemical is present in the heat transfer fluid
Wherein the permeate comprises a solvent
Wherein the permeate comprises water
Wherein the chemical comprises a polypropylene glycol
Wherein the membrane-based process comprises reverse osmosis, or nanofiltration, or organic solvent nanofiltration, or ultrafiltration, or microfiltration
Wherein the membrane-based process comprises forward osmosis
Wherein the membrane-based process comprises a size-based separation
Wherein the chemical comprises a reagent which, when in the presence of water, increases the effective specific heat capacity of water
Wherein the chemical comprises a reagent which forms a composition with water with a greater effective specific heat capacity than water
Wherein the chemical comprises a reagent which forms a composition with the heat transfer fluid with a greater effective specific heat capacity than the heat transfer fluid without said chemical
Wherein the chemical comprises a reagent which forms a composition with water which possesses a liquid-liquid phase transition
Wherein the permeate comprises water
Wherein the permeate comprises a solvent
Wherein the retentate comprises the chemical and water
Wherein the retentate comprises the chemical
Wherein the retentate comprises a polypropylene glycol
Wherein the retentate comprises a polypropylene glycol and water
Wherein the permeate is stored
Wherein the volume of liquid entering the heat transfer loop is about the same as the volume of liquid exiting or being removed from the heat transfer loop
Wherein the volume of liquid entering the heat transfer loop is about the same as the volume of liquid exiting or being removed from the heat transfer loop to ensure the total volume of liquid in the heat transfer loop remains consistent or at a desired level
Wherein the volume of liquid entering the heat transfer loop is within +/−20% the volume of liquid exiting or being removed from the heat transfer loop
Wherein the process operates until the chemical is at a desired concentration in the heat transfer loop
Wherein the process stops when the chemical is at a desired concentration in the heat transfer loop
Wherein the heat transfer fluid enters the membrane-based process as a single liquid phase solution.
Wherein the heat transfer fluid enters the membrane-based process below a cloud point temperature.
Wherein the heat transfer fluid is cooled to below its cloud point temperature before entering the membrane-based process.
Wherein the concentration of the chemical in the heat transfer fluid or heat transfer loop is monitored and/or measured
Wherein the removed heat transfer fluid entering the membrane based process or in the membrane based process is at a temperature below the cloud point temperature or liquid-liquid phase transition temperature of the heat transfer fluid, if applicable
Wherein the removed heat transfer fluid entering the membrane based process or in the membrane based process is at a temperature below the cloud point temperature or liquid-liquid phase transition temperature of the chemical in water
Wherein the removed heat transfer fluid entering the membrane based process or in the membrane based process comprises a single liquid phase combined solution
Wherein the removed heat transfer fluid entering the membrane based process or in the membrane based process comprises an aqueous solution
Wherein the membrane-based process rejects at least a portion of the chemical
Wherein the membrane-based process rejects at least a portion of the chemical because the molecular weight cutoff of the membrane is less than the molecular weight of the chemical
Wherein each step of the process is conducted simultaneously
Wherein each step of the process is conducted sequentially
Wherein some steps of the process are conducted at different rates than other steps of the process
Wherein each step of the process is conducted at about the same rate A process for removing a chemical which enhances the effective heat capacity of a heat transfer fluid from a heat transfer loop:
   Adding water to the heat transfer fluid in a heat transfer loop;
   Separating at least a portion of heat transfer fluid into a permeate and a retentate using a membrane-based process;
   Adding the permeate to the heat transfer fluid in the heat transfer fluid;
   Storing the retentate.

A process for removing a chemical which enhances the effective heat capacity of a heat transfer fluid from a heat transfer loop:
   Adding solvent to the heat transfer fluid in a heat transfer loop;
   Separating at least a portion of heat transfer fluid into a permeate and a retentate using a membrane-based process;

Adding the permeate to the heat transfer fluid in the heat transfer fluid;
Storing the retentate.
A process for removing a chemical which enhances the effective heat capacity of a heat transfer fluid from a heat transfer loop:
   Adding water to the heat transfer fluid in a heat transfer loop;
   Removing at least a portion of the heat transfer fluid from the heat transfer loop;
   Separating said removed heat transfer fluid into a permeate and a retentate using a membrane-based process;
   Adding the permeate to the heat transfer fluid in the heat transfer fluid;
   Storing the retentate.
A process for removing a portion of a chemical which enhances the effective heat capacity of a heat transfer fluid from a heat transfer loop:
   Adding solvent to the heat transfer fluid in a heat transfer loop;
   Removing at least a portion of the heat transfer fluid from the heat transfer loop;
   Separating said removed heat transfer fluid into a permeate and a retentate using a membrane-based process;
   Adding the permeate to the heat transfer fluid in the heat transfer fluid;
   Storing the retentate.
Wherein the retentate solution comprises chemical
Wherein the retentate solution comprises chemical and solvent
Wherein the permeate solution comprises solvent
Wherein the solvent comprises water
Wherein the chemical comprises a reagent which, when in the presence of the solvent, increases the effective specific heat capacity of the solvent
Wherein the chemical comprises a reagent which, when in the presence of the water, increases the effective specific heat capacity of water
Wherein the retentate is transformed into a multi-liquid phase mixture
Wherein the retentate is heated to a temperature at or above its liquid-liquid phase transition temperature
Wherein the retentate comprises a multi-liquid phase mixture
Wherein the retentate is transformed into a multi-liquid phase mixture
Wherein the retentate is transformed into a multi-liquid phase mixture by heating to a temperature at or above the liquid-liquid phase transition temperature range and is stored at a multi-liquid phase.
Wherein the retentate settles into two liquid layers while stored
Wherein the retentate is separated into a mostly solvent liquid phase and a mostly chemical liquid phase by decanting
Wherein the retentate is separated into a mostly water liquid phase and a mostly organic liquid phase by decanting
Wherein the retentate is separated into a liquid phase comprising solvent and a liquid phase comprising chemical
Wherein the retentate is separated into a liquid phase comprising water liquid phase and a liquid phase comprising an organic
Wherein at least a portion of residual chemical is removed from the separated liquid phase comprising solvent by a membrane-based process
Wherein the separated liquid phase comprising solvent is purified by removing at least a portion of residual chemical by a membrane-based process to form a permeate solution comprising solvent and a retentate solution comprising chemical
Wherein the retentate is transferred to the heater and/or storage and/or decanter
Wherein the solvent is stored
Wherein the chemical is stored
The process further comprising the following steps:
   Heating the retentate to a temperature at or above its liquid-liquid phase transition temperature or cloud point temperature to form a multi-liquid phase solution
   Separating the multi-liquid phase solution into two non-contiguously separate liquid phases
   Storing the two non-contiguously separate liquid phases in two non-contiguously separate storage tanks
The process further comprising the following steps:
   Heating the retentate to a temperature at or above its liquid-liquid phase transition temperature or cloud point temperature to form a multi-liquid phase solution comprising a first liquid phase and a second liquid phase
   Wherein the first liquid phase comprises solvent and the second liquid phase comprises chemical
   Separating the first liquid phase from the second liquid phase
   Storing first liquid phase in a separate container from the second liquid phase
The process further comprising the following steps:
   Heating the retentate to a temperature at or above its liquid-liquid phase transition temperature or cloud point temperature to form a multi-liquid phase
   Wherein the first liquid phase comprises water and the second liquid phase comprises organic polymer
   Separating the first liquid phase from the second liquid phase
   Storing first liquid phase in a separate container from the second liquid phase
The process further comprising the following steps:
   Heating the retentate to a temperature at or above its liquid-liquid phase transition temperature or cloud point temperature to form a multi-liquid phase solution comprising a first liquid phase and a second liquid phase
   Wherein the first liquid phase comprises solvent and the second liquid phase comprises chemical
   Separating the first liquid phase from the second liquid phase
   Further purifying the first liquid phase comprising solvent to remove residual chemical
   Storing purified first liquid phase in a separate container from the second liquid phase
The process further comprising:
   Heating the retentate to a temperature at or above its liquid-liquid phase transition temperature range to form a multi-liquid phase solution comprising a first liquid phase and a second liquid phase;
   Separating the first liquid phase from the second liquid phase;
   Storing first liquid phase non-contiguously separate from the second liquid phase; and
   Wherein the first liquid phase comprises solvent and the second liquid phase comprises chemical.

A composition for enhancing the specific heat capacity of water comprising:
An enhanced heat capacity composition comprising:
Polypropylene Glycol 425
Water
An enhanced heat capacity composition comprising:
Polypropylene Glycol 725
Water
An enhanced heat capacity composition comprising:
Polypropylene Glycol 1000
Water
An enhanced heat capacity composition comprising:
Polypropylene Glycol 1200
Water
An enhanced heat capacity composition comprising:
Polypropylene Glycol 2000
Water
An enhanced heat capacity composition comprising:
Polypropylene Glycol 2000
Diethylene Glycol Hexyl Ether
Water
A composition for enhancing the specific heat capacity of water comprising:
An enhanced heat capacity composition comprising:
Polypropylene Glycol 425
Propylene Glycol
Water
An enhanced heat capacity composition comprising:
Polypropylene Glycol 725
Propylene Glycol
Water
An enhanced heat capacity composition comprising:
Polypropylene Glycol 1000
Propylene Glycol
Water
An enhanced heat capacity composition comprising:
Polypropylene Glycol 1200
Propylene Glycol
Water
An enhanced heat capacity composition comprising:
Polypropylene Glycol 2000
Propylene Glycol
Water
A composition for enhancing the specific heat capacity of water comprising:
An enhanced heat capacity composition comprising:
Polypropylene Glycol 425
Ethylene Glycol
Water
An enhanced heat capacity composition comprising:
Polypropylene Glycol 725
Ethylene Glycol
Water
An enhanced heat capacity composition comprising:
Polypropylene Glycol 1000
Ethylene Glycol
Water
An enhanced heat capacity composition comprising:
Polypropylene Glycol 1200
Ethylene Glycol
Water
An enhanced heat capacity composition comprising:
Polypropylene Glycol 2000
Ethylene Glycol
Water Notes
Concentration of Permeate: In some embodiments, a permeate may comprise a solvent. In some embodiments, a permeate may comprise a chemical. In some embodiments, a permeate may comprise a chemical and a solvent. In some embodiments, a permeate may comprise a solvent with a molecular weight sufficiently small to pass through a membrane employed in separation of a portion of removed heat transfer fluid. In some embodiments, a permeate may comprise solvent and/or chemical with a molecular weight sufficiently small to pass through a membrane employed in separation of a portion of removed heat transfer fluid.
In some embodiments, the concentration of a chemical in the permeate may be greater than or equal to one or more or any combination of the following weight percent: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%
In some embodiments, the concentration of a chemical in the permeate may be less than or equal to one or more or any combination of the following weight percent: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%
Concentration of Retentate: In some embodiments, a retentate may comprise a chemical. In some embodiments, a retentate may comprise a solvent. In some embodiments, a retentate may comprise a chemical and a solvent. In some embodiments, a retentate may comprise a chemical with a molecular weight sufficiently large to be rejected by a membrane employed in separation of a portion of removed heat transfer fluid and/or remaining solvent.
In some embodiments, the concentration of a chemical in a retentate may be greater than or equal to one or more or any combination of the following weight percent: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

In some embodiments, the concentration of a chemical in a retentate may be less than or equal to one or more or any combination of the following weight percent: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Membrane Molecular Weight Cutoff: The molecular weight cutoff of a membrane may be less than, or greater than, or equal to one or more or any combination of the following: 50 g/mol, or 100 g/mol, or 150 g/mol, or 200 g/mol, or 250 g/mol, or 300 g/mol, or 400 g/mol, or 500 g/mol, or 600 g/mol, or 700 g/mol, or 800 g/mol, or 900 g/mol, or 1000 g/mol, or 1100 g/mol, or 1250 g/mol, or 1500 g/mol, or 1750 g/mol, or 2000 g/mol, or 2500 g/mol, or 3000 g/mol.

Concentration of Heat Transfer Fluid: In some embodiments, the concentration of a chemical in a heat transfer fluid may be less than, or greater than, or equal to one or more or any combination of the following weight percent: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Concentration of a Solvent in a Liquid, or Solution, or Composition, or Fluid, or any combination thereof comprising solvent: In some embodiments, the concentration of a solvent Liquid, or Solution, or Composition, or Fluid, or any combination thereof may be less than, or greater than, or equal to one or more or any combination of the following weight percent: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

Concentration of a Chemical in a Liquid, or Solution, or Composition, or Fluid, or any combination thereof comprising chemical: In some embodiments, the concentration of a chemical Liquid, or Solution, or Composition, or Fluid, or any combination thereof may be less than, or greater than, or equal to one or more or any combination of the following weight percent: 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%

EMBODIMENTS

1. A process for removing a portion of a chemical from a heat transfer loop comprising a heat transfer fluid wherein the process comprises:
    adding a solvent to the heat transfer fluid in the heat transfer loop;
    removing at least a portion of the heat transfer fluid from the heat transfer loop;
    separating said removed heat transfer fluid into a permeate and a retentate using a membrane; and
    adding at least a portion of the permeate to the heat transfer fluid in the heat transfer loop.
2. The process of embodiment 1 wherein the retentate comprises a solution of chemical and solvent.
3. The process of embodiment 1 further comprising:
    heating at least a portion of the retentate to a temperature at or above its liquid-liquid phase transition temperature range to form a multi-liquid phase solution comprising a first liquid phase and a second liquid phase;

separating the first liquid phase from the second liquid phase; and adding at least a portion of the first liquid phase to the heat transfer loop;

wherein the first liquid phase comprises solvent and the second liquid phase comprises the chemical.

4. The process of embodiment 3 wherein separating the first liquid phase from the second liquid phase comprises:

allowing the first liquid phase and the second liquid phase to settle into a first liquid layer and a second liquid layer in a tank;

separating the first liquid layer from the second liquid layer.

5. The process of embodiment 3 further comprising purifying the first liquid phase comprising solvent by removing at least a portion of the chemical using a membrane.

6. The process of embodiment 3 further comprising:

forming a second permeate and a second retentate from the first liquid phase using a membrane;

wherein the second retentate comprises the chemical;

wherein the second permeate comprises the solvent; and adding the second permeate to the heat transfer loop.

7. The process of embodiment 1 further comprising cooling the removed heat transfer fluid to a temperature below an LCST cloud point temperature or heating the removed heat transfer fluid above an UCST cloud point temperature to form a substantially single liquid phase before separating with the membrane.

8. The process of embodiment 6 further comprising cooling the first liquid phase to a temperature below the cloud point temperature of the second retentate before using the membrane.

9. The process of embodiment 1 wherein the permeate comprises the solvent.

10. The process of embodiment 1 further comprising cooling the heat transfer fluid to below its cloud point temperature before using the membrane.

11. The process of embodiment 1 wherein the solvent comprises water.

12. The process of embodiment 1 wherein the chemical comprises a polypropylene glycol.

13. The process of embodiment 1 wherein the membrane comprises a membrane suitable for reverse osmosis, nanofiltration, organic solvent nanofiltration, or ultrafiltration, microfiltration, forward osmosis, osmotically assisted reverse osmosis, or osmotically assisted nanofiltration.

14. The process of embodiment 1 further comprising monitoring the concentration of the chemical in the heat transfer loop.

15. The process of embodiment 1 further comprising ceasing the adding of the solvent and the removing of the heat transfer fluid when the concentration of the chemical in the heat transfer loop is at or below a desired concentration.

16. The process of embodiment 1 wherein the volume of the solvent added is about the same as the volume of chemical removed.

17. The process of embodiment 1 which further comprises controlling the volume of heat transfer fluid.

18. A process for adding a portion of a chemical to a heat transfer loop comprising a heat transfer fluid wherein the process comprises:

adding the chemical to the heat transfer fluid in the heat transfer loop;

removing at least a portion of the heat transfer fluid from the heat transfer loop;

separating said removed heat transfer fluid into a permeate and a retentate using a membrane; and adding at least a portion of the retentate to the heat transfer fluid in the heat transfer loop.

19. The process of embodiment 18 wherein the retentate comprises the chemical.

20. The process of embodiment 18 wherein the permeate comprises a solvent.

21. The process of embodiment 18 which further comprises controlling the concentration of the chemical in the heat transfer loop.

22. The process of embodiment 18 wherein the volume of the chemical added is about the same as the volume of solvent removed.

23. The process of embodiment 18 which further comprises controlling the volume heat transfer fluid.

24. A process for replacing a first chemical with a second chemical in a heat transfer loop comprising a heat transfer fluid comprising the first chemical wherein the process comprises:

adding the second chemical to the heat transfer fluid in a heat transfer loop;

removing at least a portion of the heat transfer fluid from the heat transfer loop;

separating said removed heat transfer fluid into a permeate and a retentate using a membrane; and adding the retentate to the heat transfer fluid in the heat transfer loop.

25. The process of embodiment 24 wherein the permeate comprises the first chemical and the retentate comprises the second chemical.

26. The process of embodiment 24 wherein the membrane comprises a nanofiltration membrane comprising a pore size to allow substantial permeation of the first chemical and substantial rejection of the second chemical.

27. The process of embodiment 24 further comprising:

heating the permeate to a temperature at or above its liquid-liquid phase transition temperature range to form a multi-liquid phase solution comprising a first liquid phase and a second liquid phase; and separating the first liquid phase from the second liquid phase;

wherein the first liquid phase comprises solvent and the second liquid phase comprises first chemical.

28. The process of embodiment 24 wherein the liquid-liquid phase transition temperature range of a composition comprising the first chemical and the solvent is different than the liquid-liquid phase transition temperature range of a composition comprising the second chemical and the solvent.

29. A process for replacing a second chemical with a first chemical in a heat transfer loop comprising heat transfer fluid wherein the process comprises:

adding a first chemical to the heat transfer fluid in a heat transfer loop;

removing at least a portion of the heat transfer fluid from the heat transfer loop;

separating said removed heat transfer fluid into a permeate and a retentate using a membrane; and adding the permeate to the heat transfer fluid in the heat transfer loop.

30. The process of embodiment 29 further comprising:
heating the retentate to a temperature at or above its liquid-liquid phase transition temperature range to form a multi-liquid phase solution comprising a first liquid phase and a second liquid phase; and
separating the first liquid phase from the second liquid phase;
wherein the first liquid phase comprises the solvent and the second liquid phase comprises the second chemical.

What is claimed is:

1. A process for removing a portion of a chemical from a heat transfer loop comprising a heat transfer fluid wherein the process comprises:
adding a solvent to the heat transfer fluid in the heat transfer loop;
removing at least a portion of the heat transfer fluid from the heat transfer loop;
separating said removed heat transfer fluid into a permeate and a retentate using a membrane; and
adding at least a portion of the permeate to the heat transfer fluid in the heat transfer loop wherein the process further comprises:
heating at least a portion of the retentate to a temperature at or above its liquid-liquid phase transition temperature range to form a multi-liquid phase solution comprising a first liquid phase and a second liquid phase;
separating the first liquid phase from the second liquid phase; and
adding at least a portion of the first liquid phase to the heat transfer loop;
wherein the first liquid phase comprises solvent and the second liquid phase comprises the chemical; and
cooling the removed heat transfer fluid to a temperature below an LCST cloud point temperature or heating the removed heat transfer fluid to a temperature above an UCST cloud point temperature to form a substantially single liquid phase before separating with the membrane; wherein the solvent comprises water and wherein the chemical comprises a glycol polymer, or a polypropylene glycol (PPG), or a polyethylene glycol (PEG), or a block-polymer, or a EO polymer, or a PO polymer, or a glycol ether, or a glycol ether polymer, or any combination thereof.

2. The process of claim 1 wherein the retentate comprises a solution of chemical and solvent.

3. The process of claim 1 wherein separating the first liquid phase from the second liquid phase comprises:
allowing the first liquid phase and the second liquid phase to settle into a first liquid layer and a second liquid layer in a tank;
separating the first liquid layer from the second liquid layer.

4. The process of claim 1 further comprising purifying the first liquid phase comprising solvent by removing at least a portion of the chemical using a membrane.

5. The process of claim 1 further comprising:
forming a second permeate and a second retentate from the first liquid phase using a membrane;
wherein the second retentate comprises the chemical;
wherein the second permeate comprises the solvent; and
adding the second permeate to the heat transfer loop.

6. The process of claim 5 further comprising cooling the first liquid phase to a temperature below the cloud point temperature of the second retentate before using the membrane.

7. The process of claim 1 wherein the permeate comprises the solvent.

8. The process of claim 1 further comprising cooling the heat transfer fluid to below its cloud point temperature before using the membrane.

9. The process of claim 1 wherein the chemical comprises a polypropylene glycol.

10. The process of claim 1 wherein the membrane comprises a membrane suitable for reverse osmosis, nanofiltration, organic solvent nanofiltration, or ultrafiltration, microfiltration, forward osmosis, osmotically assisted reverse osmosis, or osmotically assisted nanofiltration.

11. The process of claim 1 further comprising monitoring the concentration of the chemical in the heat transfer loop.

12. The process of claim 1 further comprising ceasing the adding of the solvent and the removing of the heat transfer fluid when the concentration of the chemical in the heat transfer loop is at or below a desired concentration.

13. The process of claim 1 wherein the volume of the solvent added is about the same as the volume of chemical removed.

14. The process of claim 1 which further comprises controlling the volume of heat transfer fluid.

15. A process for adding a portion of a chemical to a heat transfer loop comprising a heat transfer fluid wherein the process comprises:
adding the chemical to the heat transfer fluid in the heat transfer loop;
removing at least a portion of the heat transfer fluid from the heat transfer loop;
separating said removed heat transfer fluid into a permeate and a retentate using a membrane; and
adding at least a portion of the retentate to the heat transfer fluid in the heat transfer loop wherein the process further comprises cooling the removed heat transfer fluid to a temperature below an LCST cloud point temperature or heating the removed heat transfer fluid above an UCST cloud point temperature to form a substantially single liquid phase before separating with the membrane wherein the chemical comprises a glycol polymer, or a polypropylene glycol (PPG), or a polyethylene glycol (PEG), or a block-polymer, or a EO polymer, or a PO polymer, or a glycol ether, or a glycol ether polymer, or any combination thereof.

16. The process of claim 15 wherein the retentate comprises the chemical.

17. The process of claim 15 wherein the permeate comprises a solvent.

18. The process of claim 15 which further comprises controlling the concentration of the chemical in the heat transfer loop.

19. The process of claim 15 wherein the volume of the chemical added is about the same as the volume of solvent removed.

20. The process of claim 15 which further comprises controlling the volume heat transfer fluid.

21. A process for replacing a first chemical with a second chemical in a heat transfer loop comprising a heat transfer fluid comprising the first chemical wherein the process comprises:
adding the second chemical to the heat transfer fluid in a heat transfer loop;

removing at least a portion of the heat transfer fluid from the heat transfer loop;

separating said removed heat transfer fluid into a permeate and a retentate using a membrane; and adding the retentate to the heat transfer fluid in the heat transfer loop wherein the first chemical or the second chemical comprises a glycol polymer, or a polypropylene glycol (PPG), or a polyethylene glycol (PEG), or a block-polymer, or a EO polymer, or a PO polymer, or a glycol ether, or a glycol ether polymer, or any combination thereof.

22. The process of claim 21 wherein the permeate comprises the first chemical and the retentate comprises the second chemical.

23. The process of claim 21 wherein the membrane comprises a nanofiltration membrane comprising a pore size to allow substantial permeation of the first chemical and substantial rejection of the second chemical.

24. The process of claim 21 further comprising:

heating the permeate to a temperature at or above its liquid-liquid phase transition temperature range to form a multi-liquid phase solution comprising a first liquid phase and a second liquid phase; and separating the first liquid phase from the second liquid phase;

wherein the first liquid phase comprises solvent and the second liquid phase comprises first chemical.

25. The process of claim 21 wherein the liquid-liquid phase transition temperature range of a composition comprising the first chemical and the solvent is different than the liquid-liquid phase transition temperature range of a composition comprising the second chemical and the solvent.

26. A process for replacing a second chemical with a first chemical in a heat transfer loop comprising heat transfer fluid wherein the process comprises:

adding a first chemical to the heat transfer fluid in a heat transfer loop;

removing at least a portion of the heat transfer fluid from the heat transfer loop;

separating said removed heat transfer fluid into a permeate and a retentate using a membrane; and adding the permeate to the heat transfer fluid in the heat transfer loop wherein the first chemical comprises a glycol polymer, or a polypropylene glycol (PPG), or a polyethylene glycol (PEG), or a block-polymer, or a EO polymer, or a PO polymer, or a glycol ether, or a glycol ether polymer, or any combination thereof.

27. The process of claim 26 further comprising:

heating the retentate to a temperature at or above its liquid-liquid phase transition temperature range to form a multi-liquid phase solution comprising a first liquid phase and a second liquid phase; and separating the first liquid phase from the second liquid phase;

wherein the first liquid phase comprises the solvent and the second liquid phase comprises the second chemical.

* * * * *